(12) United States Patent
Dowty

(10) Patent No.: US 11,613,360 B2
(45) Date of Patent: Mar. 28, 2023

(54) ACTUATABLE DOOR FOR AN AIRCRAFT PASSENGER SUITE

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 178 days.

(21) Appl. No.: 17/163,052

(22) Filed: Jan. 29, 2021

(65) Prior Publication Data

US 2022/0242571 A1   Aug. 4, 2022

(51) Int. Cl.
*B64D 11/06* (2006.01)
*B64D 11/00* (2006.01)

(52) U.S. Cl.
CPC ...... *B64D 11/0606* (2014.12); *B64D 11/0023* (2013.01)

(58) Field of Classification Search
CPC .................. B64D 11/0606; B64D 11/0023
See application file for complete search history.

(56) References Cited

U.S. PATENT DOCUMENTS

| | | | |
|---|---|---|---|
| 6,715,526 B1 | 4/2004 | Brownfield et al. | |
| 9,027,880 B2 | 5/2015 | Breuer et al. | |
| 10,358,220 B2* | 7/2019 | Carlioz | B64D 11/0641 |
| 10,597,160 B2* | 3/2020 | Schliwa | B64C 1/18 |
| 2012/0012704 A1 | 1/2012 | Mosler et al. | |
| 2018/0281963 A1* | 10/2018 | Dowty | B64D 11/0606 |

(Continued)

FOREIGN PATENT DOCUMENTS

| | | |
|---|---|---|
| EP | 2429875 A1 | 3/2012 |
| EP | 1584553 B1 | 8/2016 |

(Continued)

OTHER PUBLICATIONS

U.S. Appl. No. 16/742,720, filed Jan. 14, 2020, entitled Actuatable Display Devices For Aircraft Passenger Compartment Suites.

(Continued)

*Primary Examiner* — Brady W Frazier
*Assistant Examiner* — Nevena Aleksic
(74) *Attorney, Agent, or Firm* — Suiter Swantz pc llo

(57) ABSTRACT

An actuatable door for an aircraft passenger suite may include a flexible privacy divider configured to actuate between a stowed divider position and a deployed divider position, a cartridge configured to actuate between a stowed cartridge position and a deployed cartridge position via at least one intermediate cartridge position, and a mechanism housed within the cartridge and configured to actuate the flexible privacy divider between the stowed divider position and the deployed divider position, where the flexible privacy divider may be at least partially stowed within the cartridge when in the stowed divider position. The actuatable door may be configured to actuate between a stowed door position and a deployed door position via at least one intermediate door position, and configured to separate the aircraft passenger suite from an open area within an aircraft cabin when in the deployed door position and provide privacy to the aircraft passenger suite.

15 Claims, 22 Drawing Sheets

(56) References Cited

U.S. PATENT DOCUMENTS

2019/0329891 A1* 10/2019 Bonnefoy .......... B64D 11/0023
2020/0108698 A1    4/2020 Sakurai

FOREIGN PATENT DOCUMENTS

| EP | 3572325 A1 | 11/2019 |
| EP | 3647196 A1 | 5/2020 |
| EP | 3696086 A1 | 8/2020 |
| WO | 2008032095 A1 | 3/2008 |
| WO | 2016164564 A1 | 10/2016 |

OTHER PUBLICATIONS

Extended Search Report in European Application No. 22154356.4 dated May 27, 2022, 8 pages.

* cited by examiner

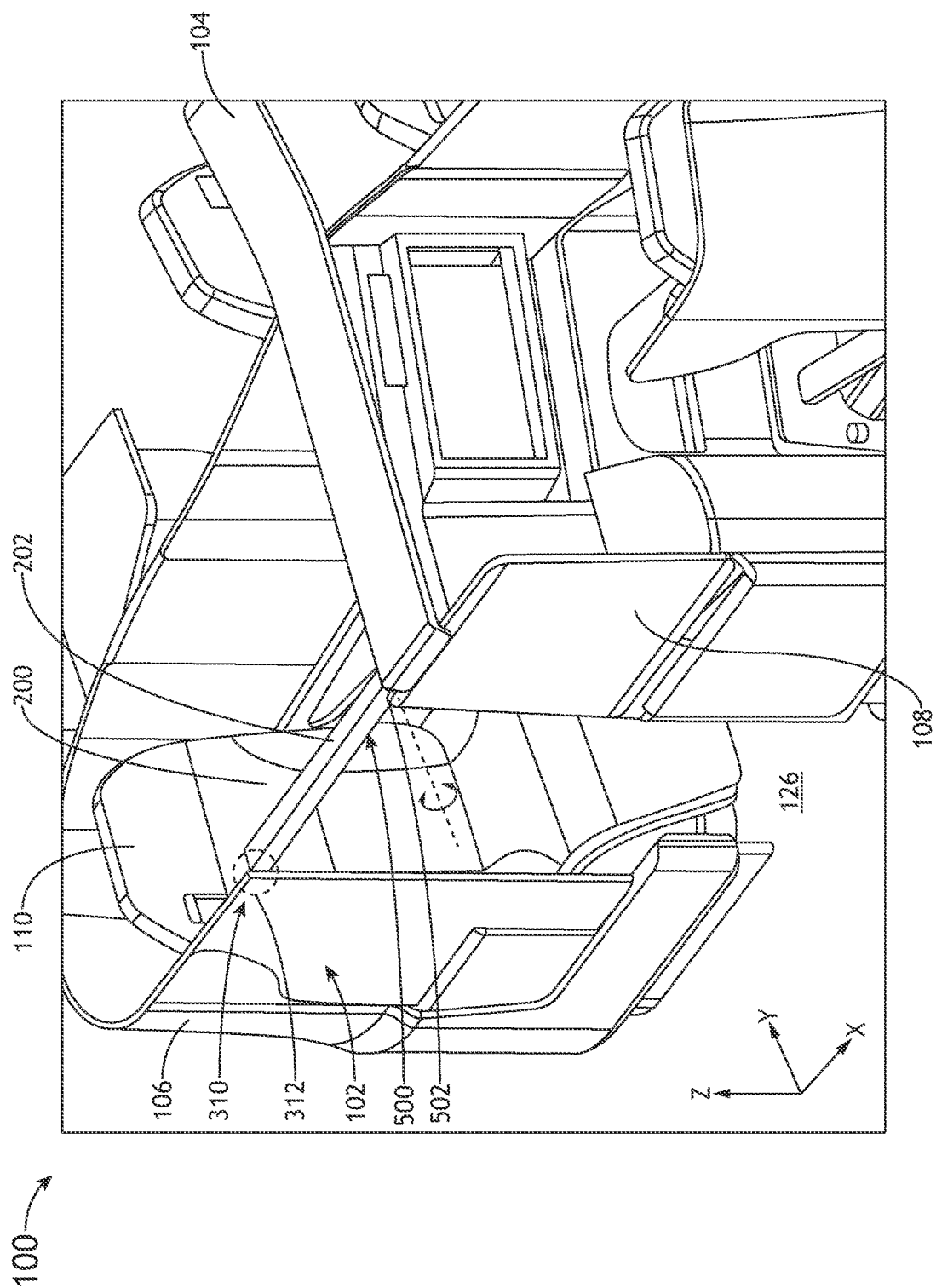

ACTUATABLE DOOR FOR AN AIRCRAFT PASSENGER SUITE

BACKGROUND

Aircraft cabin designs may include passenger suites. A particular passenger suite may include a door to separate the passenger suite from other areas in the aircraft cabin (e.g., an aisle, an adjacent passenger suite, or the like). Select doors may deploy sideways. For example, the sideways-deploying doors may be rigid and subject to issues inherent with the accompanying weight of the rigid material. By way of another example, the sideways-deploying doors may be flexible and subject to issues inherent in the flexible material due to lateral compression.

SUMMARY

An aircraft passenger suite is disclosed, in accordance with one or more embodiments of the disclosure. The aircraft passenger suite may include a suite wall installed within an aircraft cabin. The suite wall may include an opening configured to allow for access to the passenger suite from an open area within the aircraft cabin. The aircraft passenger suite may include an actuatable door coupled to the suite wall. The actuatable door may be configured to actuate between a stowed door position and a deployed door position via at least one intermediate door position. The actuatable door may be configured to separate the passenger suite from the open area within the aircraft cabin when in the deployed door position and provide privacy to the aircraft passenger suite. The actuatable door may include a flexible privacy divider. The flexible privacy divider may be configured to actuate between a stowed divider position and a deployed divider position. The actuatable door may include a cartridge. The cartridge may be configured to actuate between a stowed cartridge position and a deployed cartridge position via at least one intermediate cartridge position. The actuatable door may include a mechanism housed within the cartridge. The mechanism may be configured to actuate the flexible privacy divider between the stowed divider position and the deployed divider position. The flexible privacy divider may be at least partially stowed within the cartridge when in the stowed divider position.

In some embodiments, the actuatable door may be in the stowed door position when the cartridge is in the stowed cartridge position.

In some embodiments, the actuatable door may be in the at least one intermediate position when the cartridge is in the deployed cartridge position and the flexible privacy divider is in the stowed divider position.

In some embodiments, the actuatable door may be in the deployed door position when the flexible privacy divider is in the deployed divider position.

In some embodiments, the flexible privacy divider may be fabricated from a continuous piece of material.

In some embodiments, the flexible privacy divider may be fabricated from a plurality of segmented or slatted pieces of overlaid material.

In some embodiments, the flexible privacy divider may be fabricated from a honeycomb material or origami-folded material.

In some embodiments, at least a portion of the passenger suite may be defined by a bridge installed within the aircraft cabin.

In some embodiments, the actuatable door may include an actuation assembly with a hinge. The hinge may be coupled to at least one of the suite wall or the bridge. The cartridge may be configured to rotate between the stowed cartridge position and the deployed cartridge position via the at least one intermediate cartridge position about an axis through the hinge.

In some embodiments, the actuatable door may include an actuation assembly with a hinge. The hinge may be coupled to at least one of the suite wall or the bridge. The cartridge may be configured to rotate and translate between the stowed cartridge position and the deployed cartridge position via the at least one intermediate cartridge position about an axis through the hinge.

In some embodiments, the cartridge may be stowed within a space proximate to the bridge when in the stowed cartridge position.

In some embodiments, the passenger suite may include a channel proximate to at least one of the suite wall or the bridge. The cartridge may be configured to translate between the stowed cartridge position and the deployed cartridge position via the at least one intermediate cartridge position along the channel.

In some embodiments, the passenger suite may include an aircraft seat. The cartridge may be stowed within a space proximate to an aircraft seat when in the stowed cartridge position.

In some embodiments, the actuatable door may include an actuation assembly with a hinge. The hinge may be coupled to the suite wall. The cartridge may be configured to rotate between the stowed cartridge position and the deployed cartridge position via the at least one intermediate cartridge position about an axis through the hinge.

An actuatable door for an aircraft passenger suite is disclosed, in accordance with one or more embodiments of the disclosure. The actuatable door may include a flexible privacy divider. The flexible privacy divider may be configured to actuate between a stowed divider position and a deployed divider position. The actuatable door may include a cartridge. The cartridge may be configured to actuate between a stowed cartridge position and a deployed cartridge position via at least one intermediate cartridge position. The actuatable door may include a mechanism housed within the cartridge. The mechanism may be configured to actuate the flexible privacy divider between the stowed divider position and the deployed divider position. The flexible privacy divider may be at least partially stowed within the cartridge when in the stowed divider position. The actuatable door may be coupled to a suite wall of the aircraft passenger suite. The suite wall may include an opening configured to allow for access to the passenger suite from an open area within the aircraft cabin. The actuatable door may be configured to actuate between a stowed door position and a deployed door position via at least one intermediate door position. The actuatable door may be configured to separate the passenger suite from the open area within the aircraft cabin when in the deployed door position and provide privacy to the aircraft passenger suite.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5C illustrates an aircraft cabin with a passenger suite including an actuatable door, in accordance with one or more embodiments of the disclosure;

DETAILED DESCRIPTION OF THE INVENTION

Figure 1:
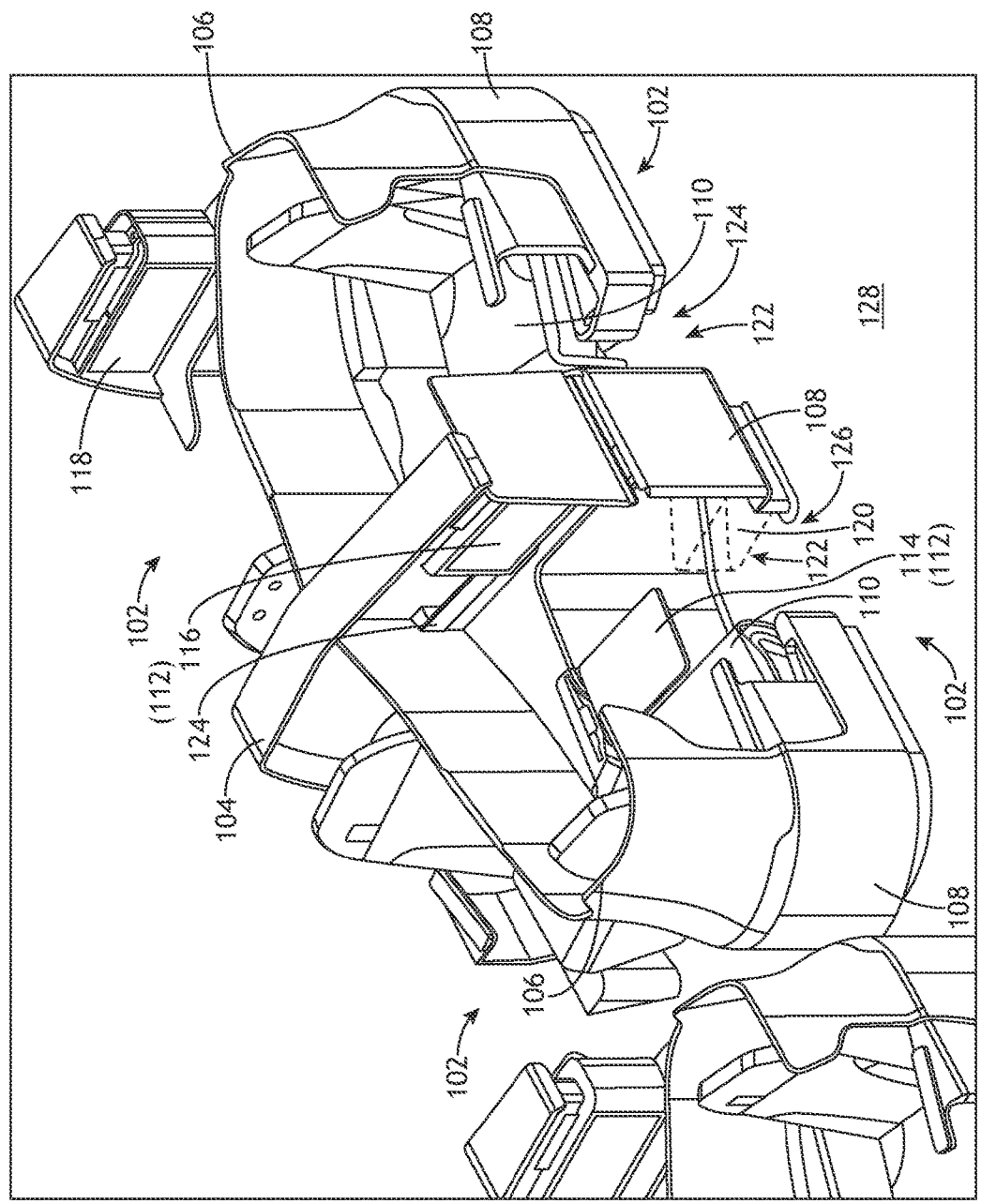
FIG. 1 illustrates an aircraft cabin with a passenger suite including an actuatable door, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-7F in general illustrate an actuatable door for an aircraft passenger suite, in accordance with one or more embodiments of the disclosure.

Aircraft cabin designs may include passenger suites. A particular passenger suite may include a door to separate the passenger suite from other areas in the aircraft cabin (e.g., an aisle, an adjacent passenger suite, or the like). The separation of the passenger suite from other areas in the aircraft cabin may provide privacy to an occupant within the passenger suite when the door is closed. When the door is open, an opening within the passenger suite may be configured to allow for access to the passenger suite from an open area within the aircraft cabin (or egress from the passenger suite into the open area within the aircraft cabin). When the door is closed, the opening may temporarily prevent egress from the passenger suite into the open area within the aircraft cabin (e.g., preventing egress only to the extent such prevention does not inconvenience an occupant or generate an unsafe environment in the event of an emergency).

Select doors may deploy sideways. For example, the sideways-deploying doors may be rigid and subject to issues inherent with the accompanying weight of the rigid material. By way of another example, the sideways-deploying doors may be flexible and subject to issues inherent in the flexible material due to lateral compression.

Aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be desirable to provide an actuatable door for an aircraft passenger suite. The door should be fabricated from a flexible material so as to reduce issues with weight. The door should be able to deploy in an upward/downward configuration so as to reduce issues with lateral compression. The door should fit within an existing product design with the minimal possible amount of disruption to the existing design, so as to streamline the certification process with respect to aviation guidelines and standards.

FIG. 1 illustrates an aircraft cabin 100 and one or more passenger suites 102, in accordance with one or more embodiments of the disclosure.

Where there are multiple passenger suites 102, the multiple passenger suites 102 may be separated by a bridge 104. The bridge 104 may define at least a portion of each of the multiple passenger suites 102. It is noted herein adjacent passenger suites 102 may be considered as on particular sides of the bridge 104. Where there are multiple passenger suites 102, the multiple passenger suites 102 may be arranged in an inboard/outboard configuration and/or a forward/rearward configuration. It is noted herein, however, the multiple passenger suites 102 may be arranged in any configuration within the aircraft cabin 100.

The passenger suite 102 may include a suite wall 106 with one or more suite wall elements 108. For example, at least some of the one or more suite wall elements 108 may be a component of a particular suite wall 106 corresponding to a particular passenger suite 102. By way of another example, at least some of the one or more suite wall elements 108 (e.g., to the entirety of a suite wall 106 structure) may be shared between adjacent passenger suites 102.

The bridge 104 and/or the suite wall 106 may be implemented as a divider or structure separating adjacent passenger suites 102 and/or separating a passenger suite 102 from an area within the aircraft cabin 100. For example, where the bridge 104 is implemented as a separator, the bridge 104 may be configured to allow for the multiple passenger suites 102 to be installed within the aircraft cabin 100 in a more compact arrangement. In this regard, the amount of floor area of the aircraft cabin 100 necessary for the one or more aircraft seats 110 may be reduced.

It is noted herein portions of the suite wall 106 have been cut away or removed for purposes of clarity within FIG. 1.

The one or more passenger suites 102 may include one or more aircraft seats 110 (e.g., business class or first-class passenger seats). It is noted herein the terms "aircraft seats" and "passenger seats" may be considered equivalent, for purposes of the disclosure.

The one or more aircraft seats 110 may include, but are not limited to, seat pans, seat cushions, legs, support members, actuatable armrests, seatbelts, or the like. The one or more aircraft seats 110 may be attachable to embedded seat tracks located in a floor of the aircraft cabin 100 via conventional track fasteners and/or be couplable to the suite wall 106 (e.g., where the suite wall 106 may be attachable to embedded seat tracks located in the floor of the aircraft cabin 100 via conventional track fasteners).

An aircraft seat 110 may be rotatable about an axis (e.g., swivelable). The aircraft seat 110 may be fully positionable between the outer limits of motion as defined by the moveable components of the aircraft seat 110 and/or one or more auxiliary monuments 112 of the passenger suite 102. It is noted herein an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted herein that any position that does not meet the above-defined requirements of the TTL position may be considered a non-TTL position, for purposes of the present disclosure. Further, it is noted herein the aircraft seat 110 may be actuatable (e.g., translatable and/or rotatable) from the TTL position to a non-TTL position, and/or vice versa. Further, it is noted herein the aircraft seat 110 may be capable of a fully upright or raised position, and that the TTL position may have a more reclined seat back cushion and a more angled upward seat pan cushion as compared to the fully upright or raised position. Therefore, the above description should not be interpreted as a limitation on the present disclosure but merely an illustration.

In general, the aircraft seat 110 may be translatable (e.g., trackable or slidable). The aircraft seat 110 may be rotatable about an axis cross-wise through the aircraft seat 110 into a position including, but not limited to, an upright or raised position, one or more lounge or reclined positions, and a lie-flat or bed position. For example, the aircraft seat 110 may transition directly between the upright or raised position and the lie-flat or bed position. By way of another example, it is noted herein the aircraft seat 110 may transition through one or more lounge or reclined positions between the upright or raised position and the lie-flat or bed position. By way of another example, the aircraft seat 110 may transition into one or more lounge reclined positions in a motion separate from the transition between the upright or raised position and the lie-flat or bed position. Therefore, the above description should not be interpreted as a limitation on the scope of the disclosure but merely an illustration.

The aircraft seat 110 may be configured to avoid contact with the one or more auxiliary monuments 112 when transitioning between positions (e.g., between the upright or raised position and the lie-flat or bed position). It is noted herein that at least some components (e.g., at least a portion of the bridge 104, the suite wall 106 with suite wall elements 108, the one or more auxiliary monuments 112, or the like) may conform to a portion of an aircraft seat 110. In this regard, the amount of floor area of the aircraft cabin 100 necessary for the one or more aircraft seats 110 may be reduced.

The one or more auxiliary monuments 112 may include, but are not limited to, a structure 114 with a horizontal (or substantially horizontal) surface such as a tray or table, a side stand, or the like. The structure 114 may include a top surface, a bottom surface, and/or one or more side surfaces. For example, a structure 114 may include a single continuous side surface where all corners are rounded. By way of another example, the structure 114 may include up to an N number of side surfaces where the auxiliary monument includes up to an N number of corners. The structure 114 may be actuatable (e.g., may extend a select distance from a stored position to an extended position proximate to a passenger, similar to an aircraft tray table). It is noted herein, however, that the structure 114 may be fixed in position.

The one or more auxiliary monuments 112 may include, but are not limited to, a structure 116 with a vertical (or substantially vertical) surface such as an actuatable privacy panel of the bridge 104. The structure 116 may be untrimmed or may be covered with trim (e.g., interior or exterior décor panels) matching other trim within the passenger suite 102 (and/or the aircraft cabin 100).

The structure 116 may have an in-flight entertainment (IFE) device 118 attached to its vertical (or substantially vertical) surface. For example, where the structure 116 is actuatable, the IFE device 118 may be actuatable. It is noted herein the structure 116 may itself be an IFE device 118. In addition, it is noted herein the IFE device 118 may be coupled to other monuments (e.g., in an actuatable position or a fixed position) within the aircraft cabin 100. A discussion of bridges, actuatable privacy panels, and IFE devices within passenger suites may be found in U.S. application Ser. No. 16/742,720, filed on Jan. 14, 2020, which is incorporated herein in the entirety.

The passenger suite 102 may include an ottoman 120 within a footwell 122. The ottoman 120 may be usable by a passenger in the aircraft seat 110 when the corresponding aircraft seat 110 is in the upright or raised position, the one or more reclined or lounge positions, and/or the lie-flat or bed position. For example, the ottoman 120 may form a portion of a bed surface when the corresponding aircraft seat 110 is in the lie-flat or bed position. The ottoman 120 may be usable by a passenger in an aircraft seat 110 positioned proximate to the passenger suite 102 when the corresponding aircraft seat 110 is in a reclined or lounge position.

The ottoman 120 may be configured to translate and/or rotate about an axis through a sidewall of the ottoman 120 to direct a top surface to a passenger occupying the aircraft seat 110. For example, where the ottoman 120 may be configured to both translate and rotate, the ottoman 120 may be configured to independently rotate and/or translate. By way of another example, where the ottoman 120 may be configured to both translate and rotate, a rotation may prevent further translation until the ottoman 120 is returned to a select position and/or a translation may prevent further rotation until the ottoman 120 is returned to a select position.

One or more dimensions of the footwell 122 may be changed by transitioning the aircraft seat 110 between the upright or raised position, the one or more lounge or reclined positions, and the lie-flat or bed position. It is noted herein that a portion of the ottoman 120 may be actuatable (e.g., along a set of tracks or linear rails) to a position outside of the footwell 122.

It is noted herein, however, the aircraft seat 110 and/or the ottoman 120 may be limited to an upright or raised position and/or one or more lounge or reclined positions. In addition, it is noted herein the aircraft seat 110 may be the sole component forming a bed when the aircraft seat 110 is in a lie-flat or bed position. Therefore, the above description should not be interpreted as a limitation on the present disclosure but merely an illustration.

The passenger suite 102 may include one or more storage compartments 124. The one or more storage compartments 124 may be positioned proximate to or integrated within the bridge 104 and/or the suite wall 106 of the passenger suite 102. The one or more storage compartments 124 may be coupled to and/or at least be partially inset in the one or more auxiliary monuments 112 (e.g., the structure 114, the structure 116, or the like), the ottoman 120, or the like.

At least some of the one or more storage compartments 124 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

At least some of the one or more storage compartments 124 may include one or more electronic connections for one or more passenger amenities such as, but not limited to, one or more charging ports, one or more charging cables, or the like.

At least some of the one or more storage compartments 124 may include one or more electronic connections in communication with one or more components of the passenger suite 102 such as, but not limited to, one or more display device connection ports, one or more display device connection cables, one or more audio output jacks (e.g., headphone jacks), one or more audio input jacks, or the like.

At least some of the one or more storage compartments 124 may include one or more safety devices (e.g., air masks, personal floatation devices, or the like).

At least some of the one or more storage compartments 124 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

A cavity may be defined within the one or more storage compartments 124. One or more shelves may be installed within the cavity. At least some of the one or more storage compartments 124 may include a corresponding door. For example, a door may be fully-opaque or solid. By way of another example, a door may be at least partially fabricated from a transparent material (e.g., glass, plastic, or the like) or include a patterned or unpatterned set of cut-outs configured or designed to meet aviation guidelines and/or standards.

The passenger suite 102 may include one or more accessories. For example, the one or more lights and/or the one or more vents may be coupled to and/or partially inset in the one or more suite wall elements 108 of the suite wall 106, the bridge 104, or other locations within the passenger suite 102. By way of another example, the one or more accessories may include one or more electronics or electronic devices. For instance, the one or more accessories may include, but are not limited to, the one or more IFE devices 118, one or more speakers configured to provide media content separate from the media content shown on the one or more IFE devices 118 and/or accompanying the media content shown on the one or more IFE devices 118, one or more lights or lighted panels, one or more ventilation devices, one or more aircraft seat 110 actuation devices (e.g., assemblies, controls, actuators, and/or the like), one or more air flow or temperature control devices, one or more visual and/or auditory output control devices, or the like.

The suite wall 106 may include an opening 126 within the one or more suite wall elements 108 into the passenger suite 102. The opening 126 may allow for access to the passenger suite 102 from an aircraft aisle 128 within the aircraft cabin 100.

FIGS. 2A-6D illustrate the aircraft cabin 100 including the passenger suite 102, in accordance with one or more embodiments of the disclosure.

The aircraft passenger compartment suite 102 may include an actuatable door 200 for the opening 126. It is noted herein "actuatable door" and variants including, but not limited to, actuatable screen", "door", and "screen" may be considered equivalent, for purposes of the disclosure.

The actuatable door 200 may include a cartridge 202. The cartridge 202 may be actuatable between a stowed cartridge position, a deployed cartridge position, and one or more intermediate cartridge positions. The actuatable door 200 may include a flexible privacy divider 204. The flexible privacy divider 204 may be actuatable between a stowed divider position, a deployed divider position, and one or more intermediate divider positions.

It is noted herein that including a flexible privacy divider 204 in the actuatable door 200 may reduce or minimize the footprint of the actuatable door 200 within the passenger suite 102 when in a stowed position, thus reducing or minimizing the amount of disruption to an existing design of the passenger suite 102 (e.g., which may allow for retrofitting existing passenger suites 102) and potentially streamlining the certification process (e.g., of the actuatable door 200 and/or passenger suites 102 including the actuatable door 200) with respect to aviation guidelines and standards.

Figure 2A:
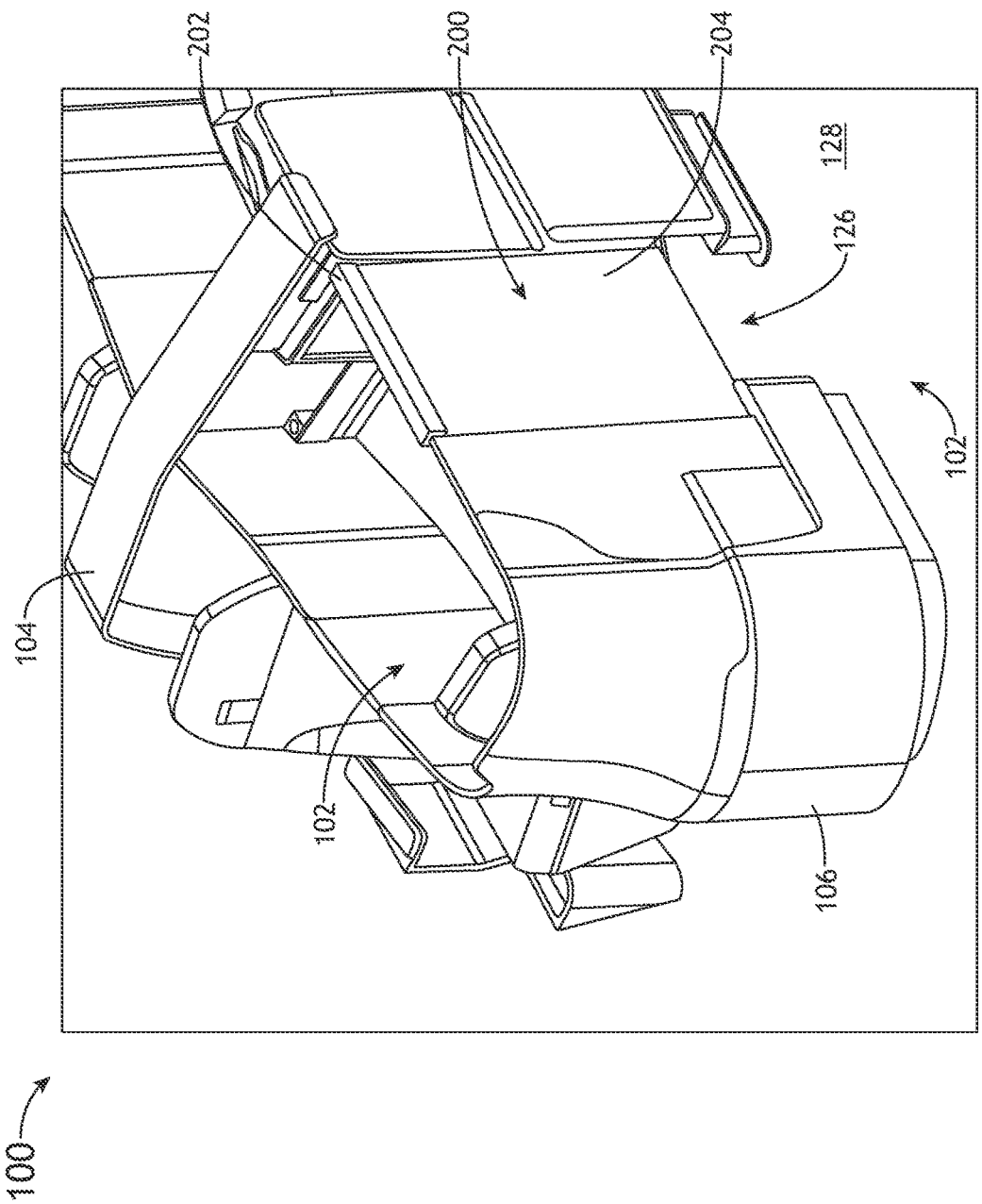
FIG. 2A illustrates an aircraft cabin with a passenger suite including an actuatable door, in accordance with one or more embodiments of the disclosure.
Figure 2B:
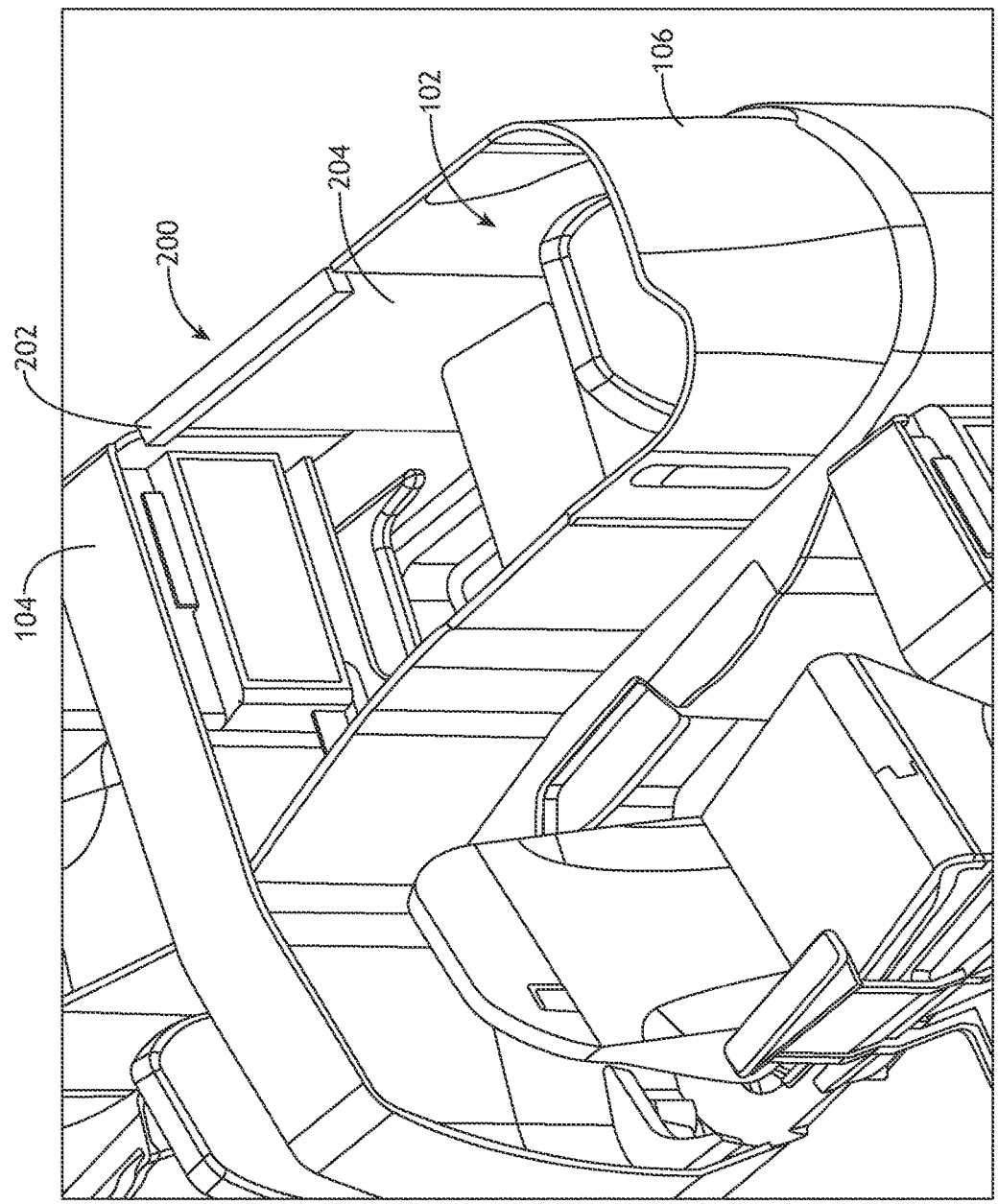
FIG. 2B illustrates an aircraft cabin with a passenger suite including an actuatable door, in accordance with one or more embodiments of the disclosure.

Referring now to FIGS. 2A and 2B, the actuatable door 200 is illustrated in a deployed door position, in accordance with one or more embodiments of the disclosure. In FIGS. 2A and 2B, the cartridge 202 is in the deployed cartridge position and the flexible privacy divider 204 is in the deployed divider position. It is noted herein, however, the actuatable door 200 may also configured for a stowed door position, where the cartridge 202 is in the stowed cartridge position and the flexible privacy divider 204 is in the stowed divider position. For example, the actuatable door 200 may be in the stowed door position during the TTL phases of flight. In addition, it is noted herein the actuatable door 200 may also be configured for one or more intermediate door positions. For example, in one intermediate door position the cartridge 202 is in the deployed cartridge position and the flexible privacy divider 204 is in the stowed divider position. By way of another example, the actuatable door 200 may be in a particular intermediate door position during transition between the stowed door position and the deployed door position.

The actuatable door 200 may separate the passenger suite 102 from other areas in the aircraft cabin 100 and may provide privacy to an occupant within the passenger suite 102 when the actuatable door 200 is in the deployed door position. When the actuatable door 200 is in the stowed door position (e.g., is open), the opening 126 within the passenger suite 102 may be configured to allow for access to the passenger suite 102 from an open area (e.g., the aircraft aisle 128, or other open area) within the aircraft cabin 100 (or egress from the passenger suite 102 into the open area within the aircraft cabin 100). When the door is in the stowed door position, the opening 126 may temporarily prevent egress from the passenger suite 102 into the open area within the aircraft cabin 100 (e.g., preventing egress only to the extent such prevention does not inconvenience an occupant or generate an unsafe environment in the event of an emergency).

Figure 3A:
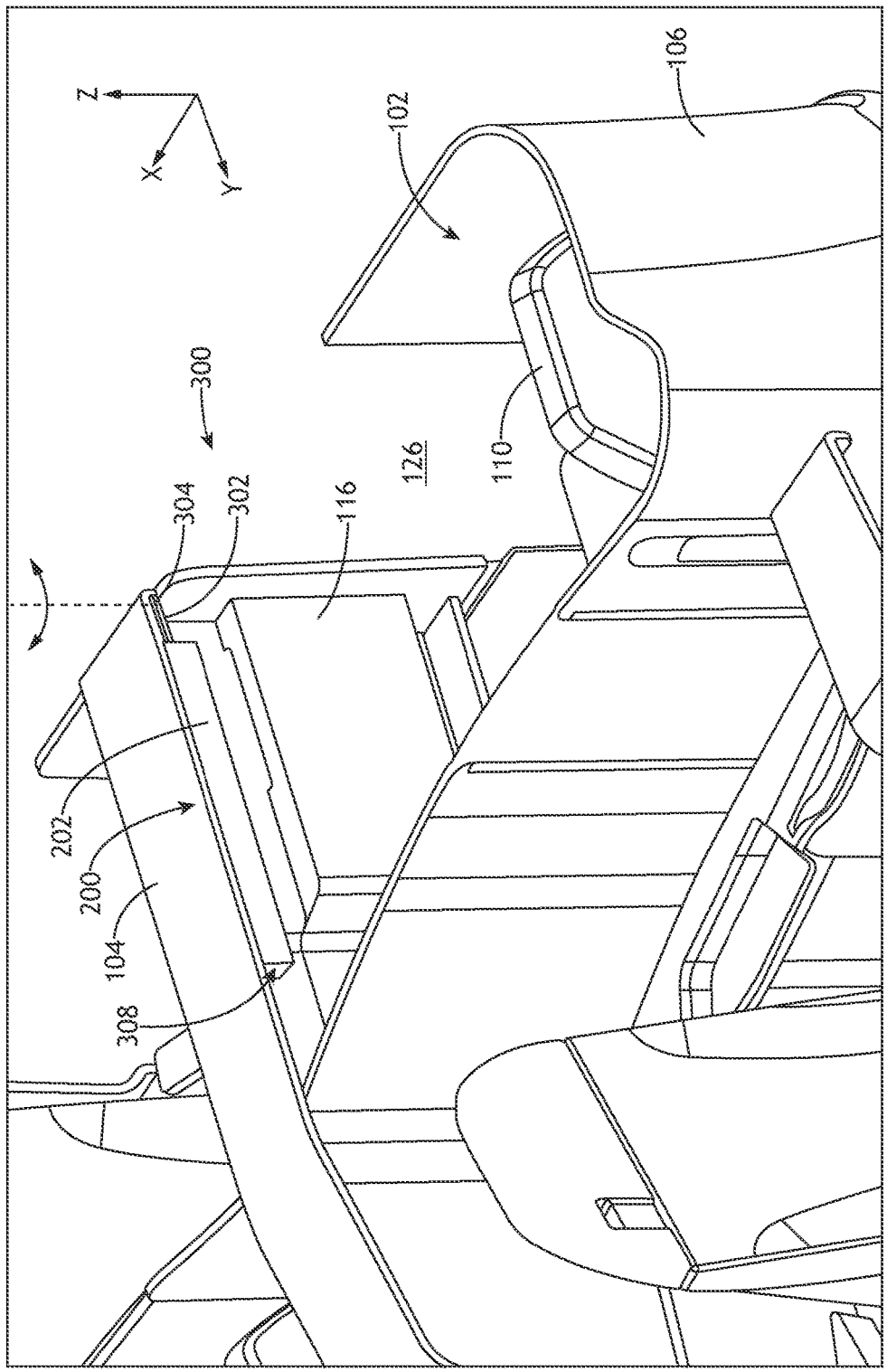
FIG. 3A illustrates an aircraft cabin with a passenger suite including an actuatable door, in accordance with one or more embodiments of the disclosure.
Figure 3B:
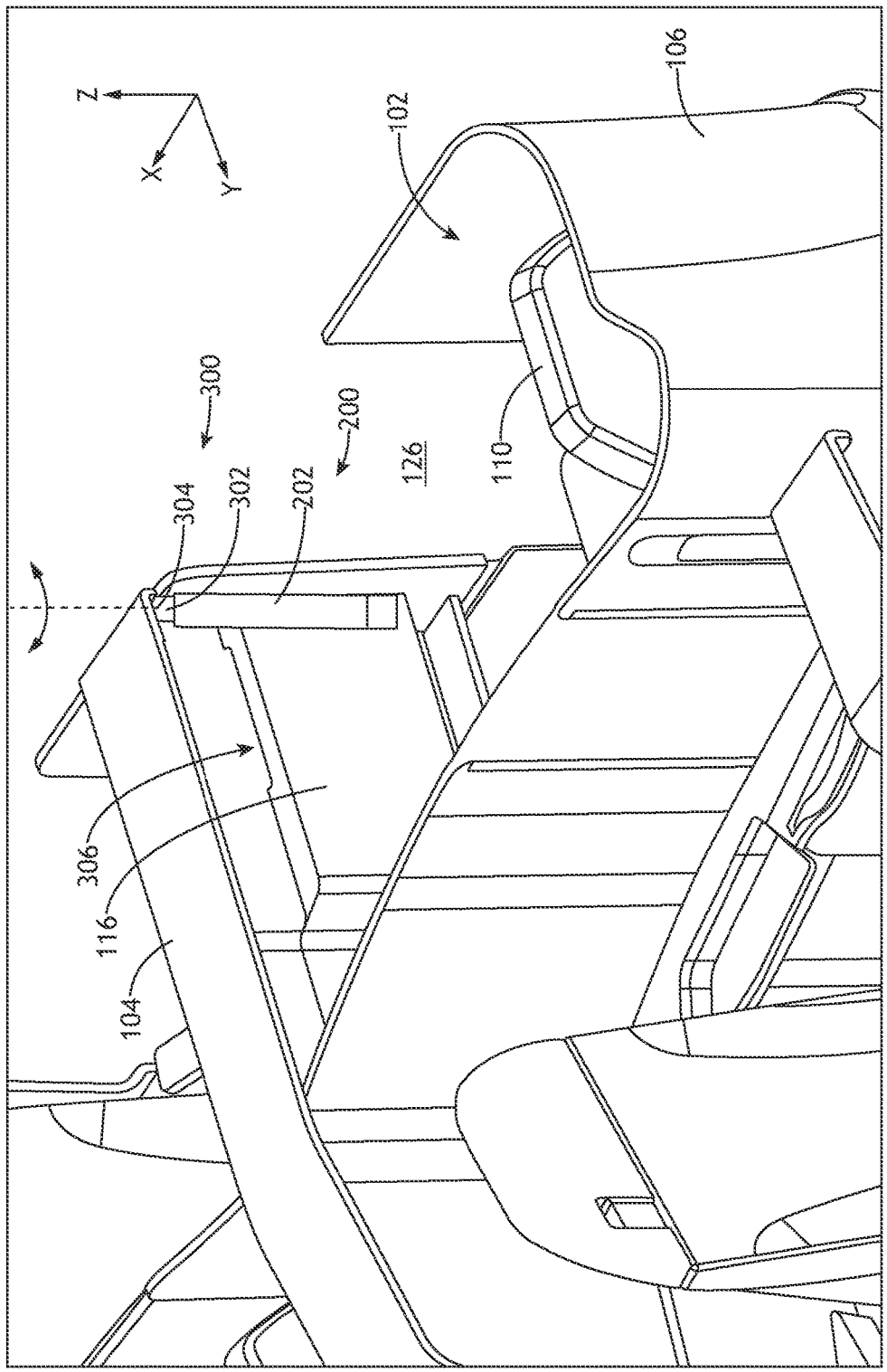
FIG. 3B illustrates an aircraft cabin with a passenger suite including an actuatable door, in accordance with one or more embodiments of the disclosure.
Figure 3C:
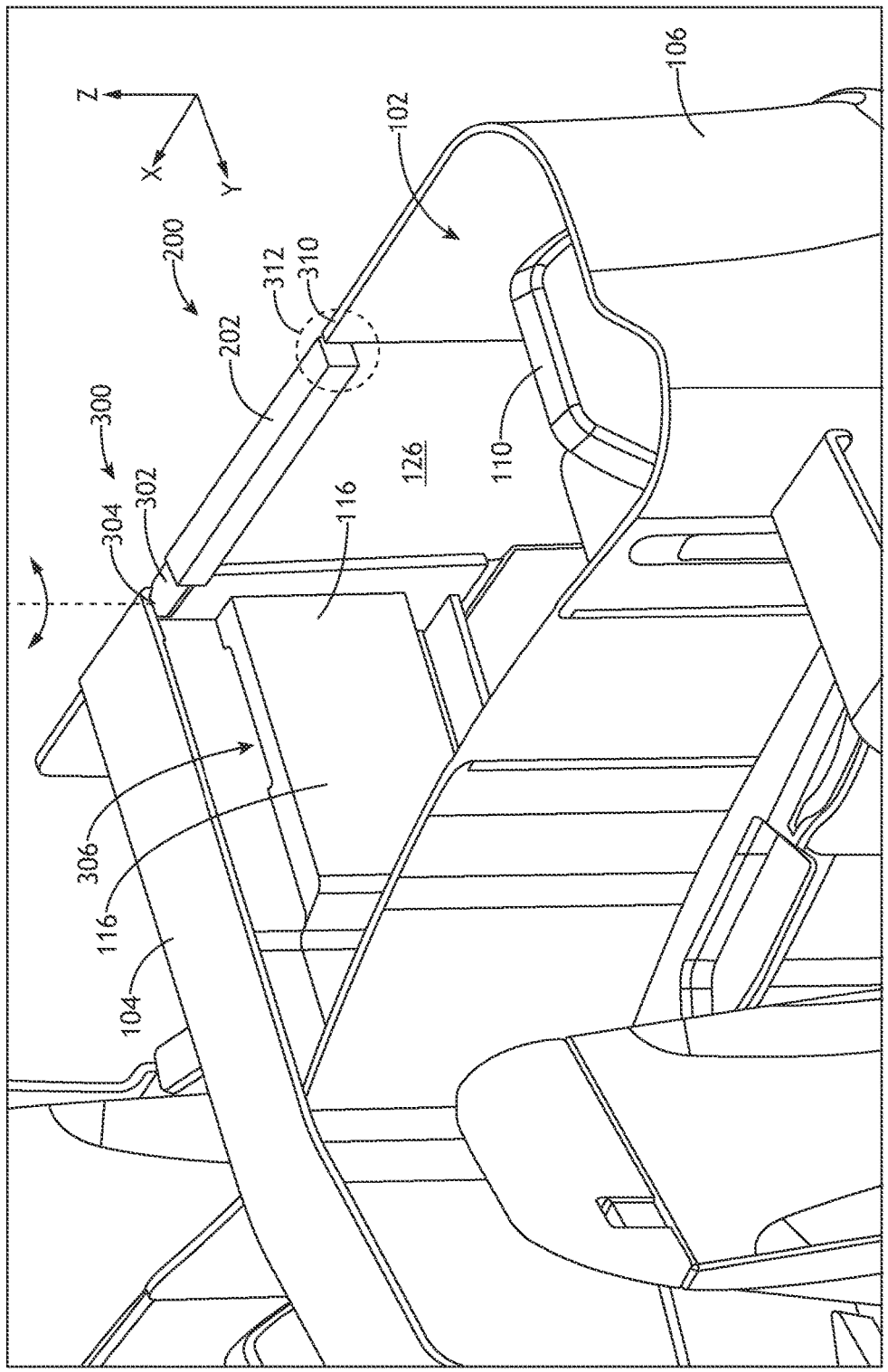
FIG. 3C illustrates an aircraft cabin with a passenger suite including an actuatable door, in accordance with one or more embodiments of the disclosure.

Referring now to FIGS. 3A-3C, an example embodiment of a set of cartridge positions are illustrated, in accordance with one or more embodiments of the disclosure.

The actuatable door 200 may include an actuation assembly 300. For example, the actuation assembly 300 may include an arm 302 coupled to the cartridge 202 and a hinge 304, where the hinge 304 is coupled to the bridge 104 and/or the suite wall 106 (e.g., one or more suite wall elements 108). It is noted herein, however, the hinge 304 may be directly coupled to the cartridge 202, such that the arm 302 is not required. The cartridge 202 may be coupled to the bridge 104 and/or the suite wall 106 (e.g., one or more suite wall elements 108) via the actuation assembly 300.

The cartridge 202 may be stowed in a space 306 within the passenger suite 102 that is intuitive and easily accessible. For example, the space 306 may be proximate to a top edge of the passenger suite 102 (e.g., of the bridge 104), and proximate to the opening 126. By way of another example, the space 306 may be proximate to a top edge of the suite wall 106, and proximate to the opening 126.

The cartridge 202 may be actuatable via the actuation assembly 300. For example, the cartridge 202 may be rotatable about an axis (e.g., a vertical or substantially vertical axis, or other axis) via the hinge 304 between the stowed cartridge position (e.g., as illustrated in FIG. 3A) and the deployed cartridge position (e.g., as illustrated in FIG. 3C) through one or more intermediate cartridge positions (e.g., one being illustrated in FIG. 3B). For instance, the hinge 304 may include a smooth-bore pin. By way of another example, the cartridge 202 may be rotatable and translatable about an axis (e.g., a vertical or substantially vertical axis, or other axis) via the hinge 304 between the stowed cartridge position (e.g., as illustrated in FIG. 3A) and the deployed cartridge position (e.g., as illustrated in FIG. 3C) through one or more intermediate cartridge positions (e.g., one being illustrated in FIG. 3B). For instance, the hinge 304 may include a threaded pin or screw. It is noted herein the stowed cartridge position as illustrated in FIG. 3A may be considered a stowed door position. In addition, it is noted herein the deployed cartridge position as illustrated in FIG. 3C may be considered an intermediate door position.

The cartridge 202 may be held in the stowed cartridge position within the space 306 via an interlocking assembly 308. For example, the cartridge 202 may be coupled to the bridge 104 and/or the suite wall 106 via the interlocking assembly 308. The cartridge 202 may be held in the deployed cartridge position across the opening 126 via an interlocking assembly 310. For example, the cartridge 202 may be coupled to a component installed within an area 312 or proximate to the area 312 via the interlocking assembly 308. The interlocking assemblies 308, 310 may include, but are not limited to, latch assemblies, magnetic assemblies, or the like. It is noted herein the interlocking assemblies 308, 310 may be standalone, or may share components (e.g., shared latch components, magnetic components, or the like). The cartridge 202 may be received by a notch or sit on a landing within the area 312 proximate to the opening 126 when in the deployed cartridge position.

Although embodiments of the disclosure illustrate the actuatable door 200 being stowed in the space 306, the stowed door position may be anywhere within the passenger suite 102 that would still allow for a deployed position within the opening 126.

Figure 4A:
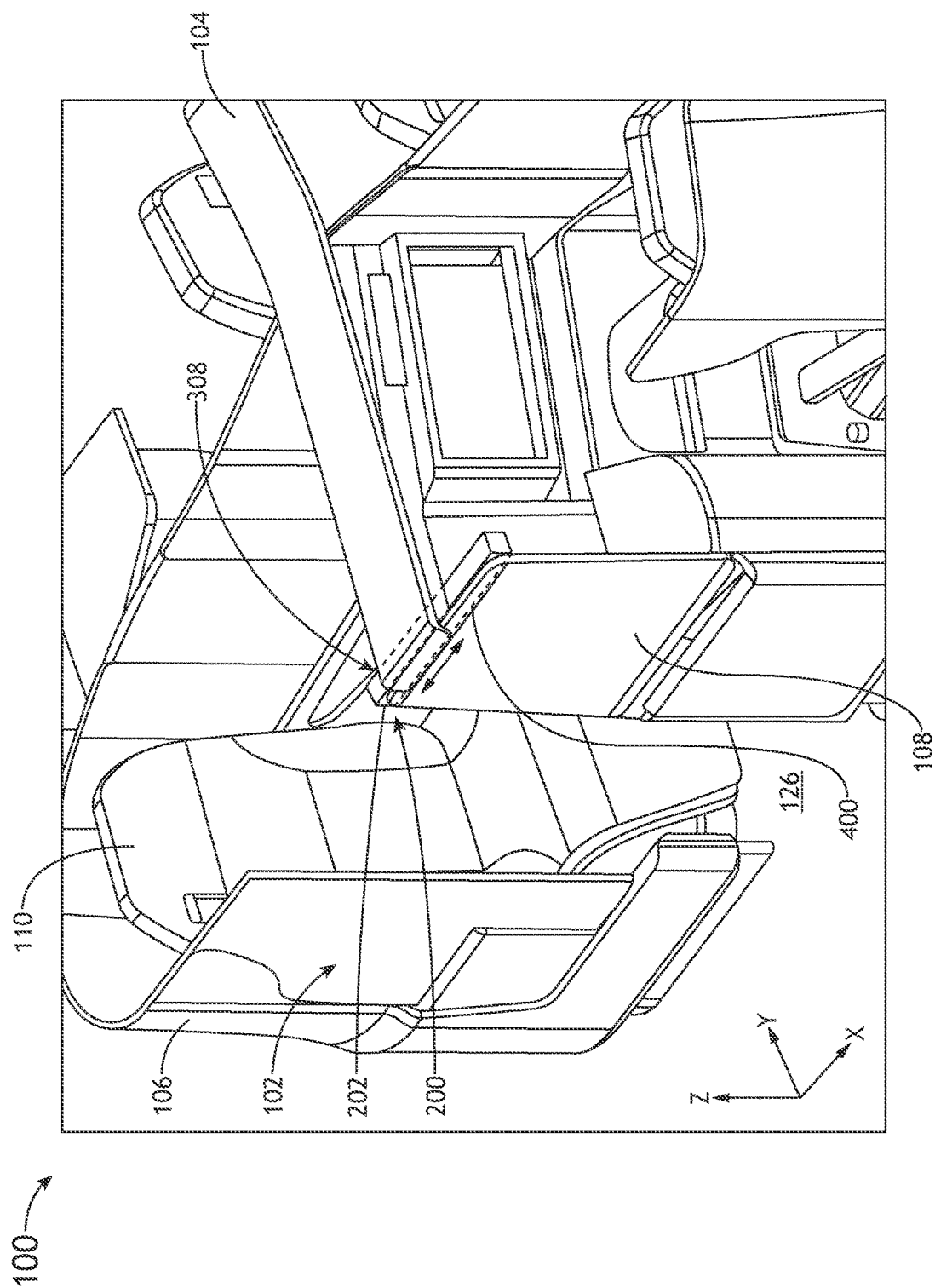
FIG. 4A illustrates an aircraft cabin with a passenger suite including an actuatable door, in accordance with one or more embodiments of the disclosure.
Figure 4B:
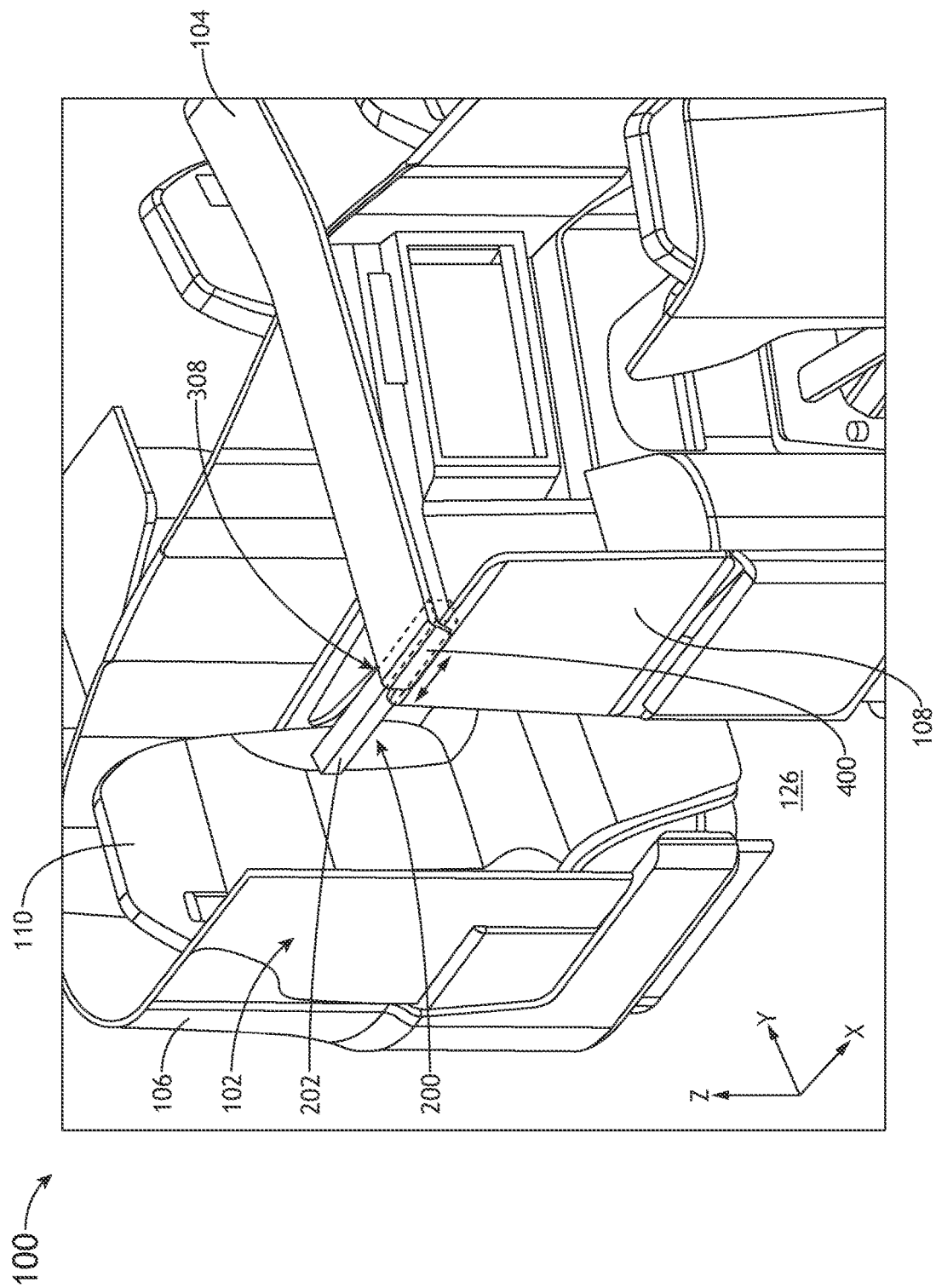
FIG. 4B illustrates an aircraft cabin with a passenger suite including an actuatable door, in accordance with one or more embodiments of the disclosure.
Figure 4C:
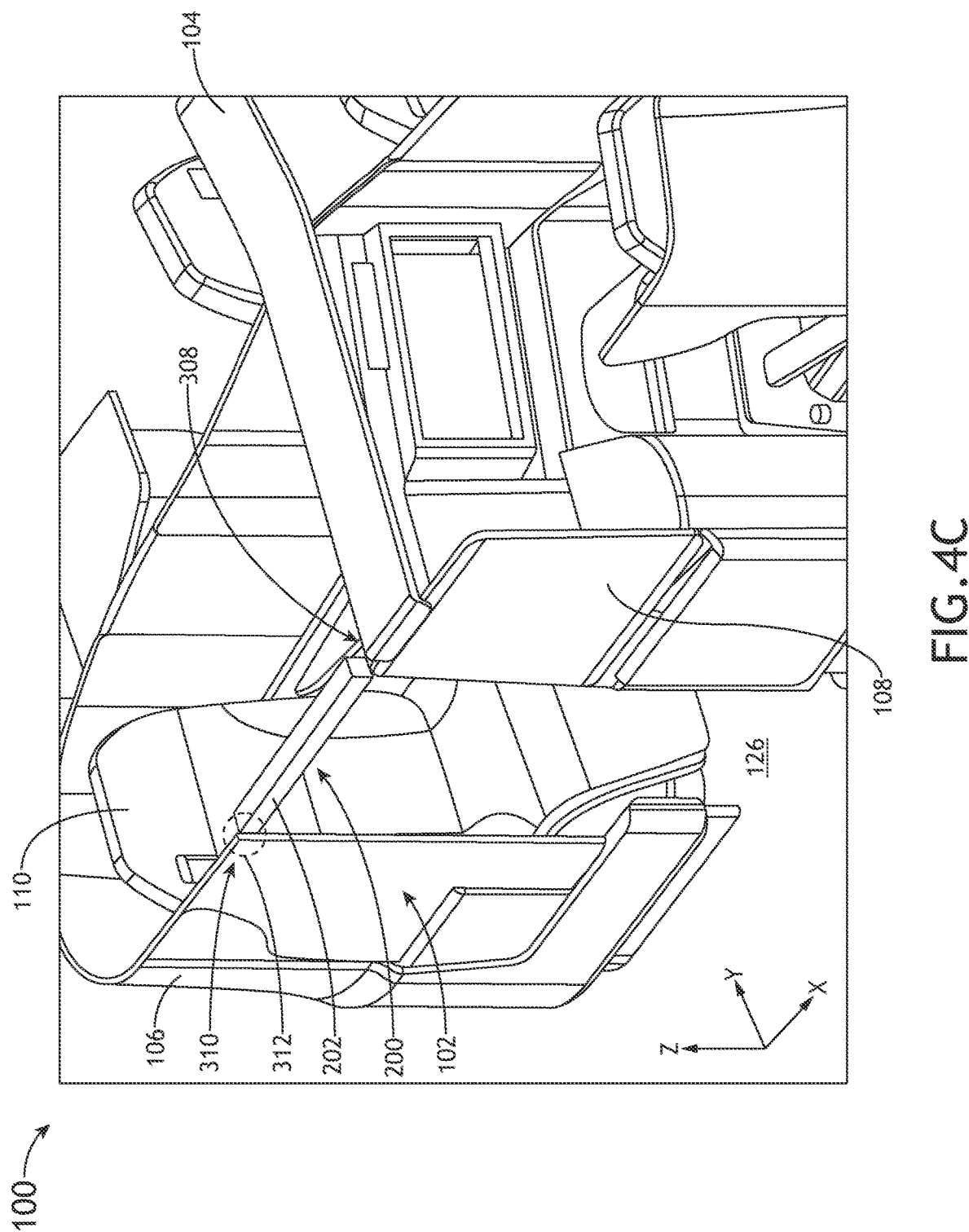
FIG. 4C illustrates an aircraft cabin with a passenger suite including an actuatable door, in accordance with one or more embodiments of the disclosure.

Referring now to FIGS. 4A-4C, an example embodiment of a set of cartridge positions are illustrated, in accordance with one or more embodiments of the disclosure.

The cartridge 202 may be set within a channel 400 proximate to the bridge 104 and/or the suite wall 106 (e.g., one or more suite wall elements 108) that is intuitive and easily accessible. For example, the space 306 may be proximate to a top edge of the passenger suite 102 (e.g., of the bridge 104) and proximate to the opening 126. For instance, the channel 400 may pass through the bridge 104 and/or one or more structures 116 into an adjacent passenger suite 102. The cartridge 202 may be visible when in the stowed cartridge position in the adjacent passenger suite or may be covered. In addition, the channel 400 may be set within the suite wall 106 (e.g., one or more suite wall elements 108), such that the cartridge 202 passes through a cavity within the suite wall 106 (e.g., one or more suite wall elements 108).

The cartridge 202 may be actuatable along the channel 400. For example, the cartridge 202 may be translated through the channel 400 between the stowed cartridge position (e.g., as illustrated in FIG. 4A) and the deployed cartridge position (e.g., as illustrated in FIG. 4C) through one or more intermediate cartridge positions (e.g., one being illustrated in FIG. 4B). It is noted herein the stowed cartridge position as illustrated in FIG. 4A may be considered a stowed door position. In addition, it is noted herein the deployed cartridge position as illustrated in FIG. 4C may be considered an intermediate door position.

The cartridge 202 may be held in the stowed cartridge position within the channel 400 via the interlocking assembly 308. For example, the cartridge 202 may be coupled to the bridge 104 and/or the suite wall 106 via the interlocking assembly 308. The cartridge 202 may be held in the deployed cartridge position across the opening 126 via the interlocking assembly 310. For example, the cartridge 202 may be coupled to a component installed within the area 312 or proximate to the area 312 via the interlocking assembly 308. The cartridge 202 may be received by a notch or sit on a landing within the area 312 proximate to the opening 126 when in the deployed cartridge position.

Figure 5A:
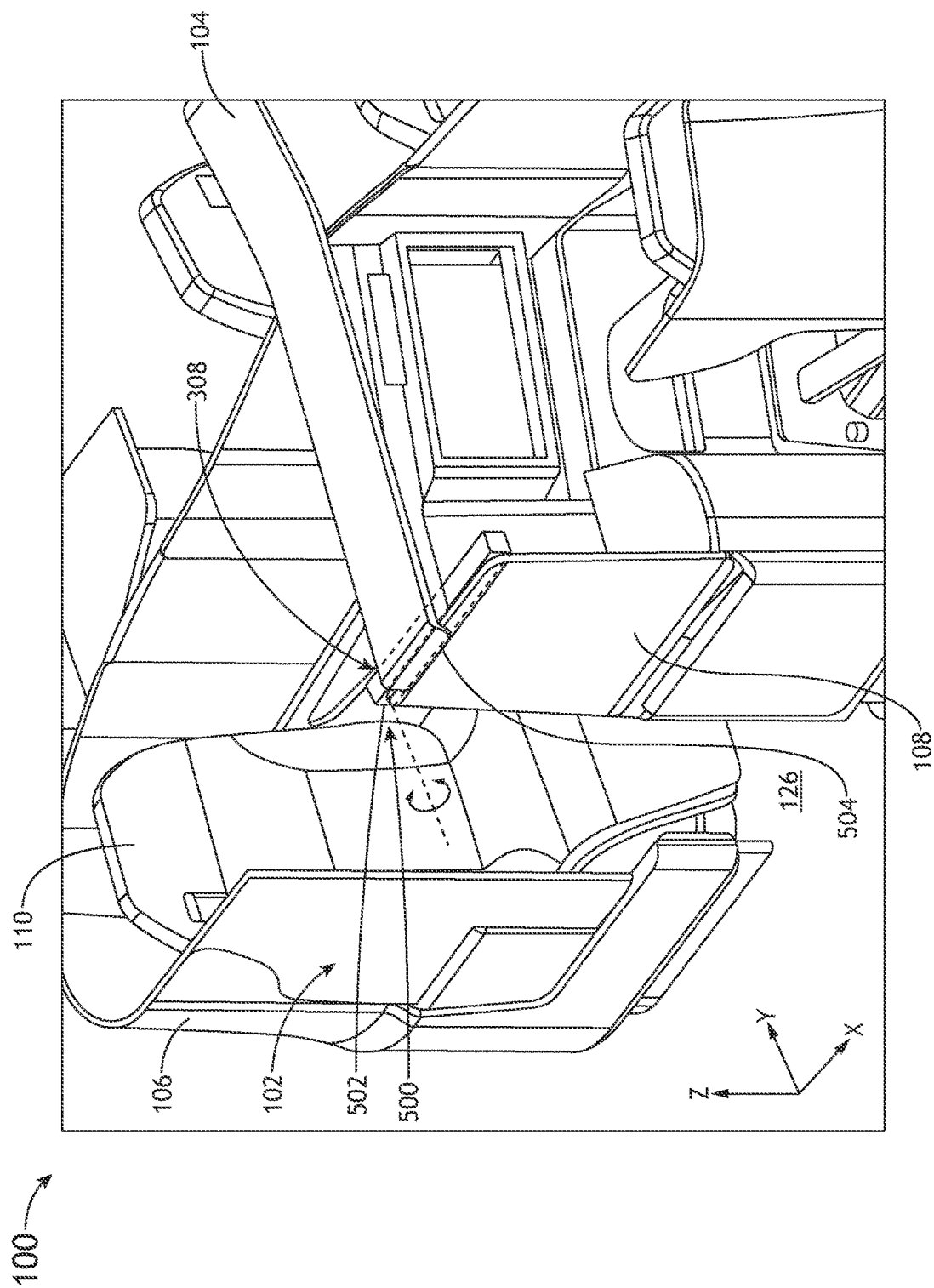
FIG. 5A illustrates an aircraft cabin with a passenger suite including an actuatable door, in accordance with one or more embodiments of the disclosure.
Figure 5B:
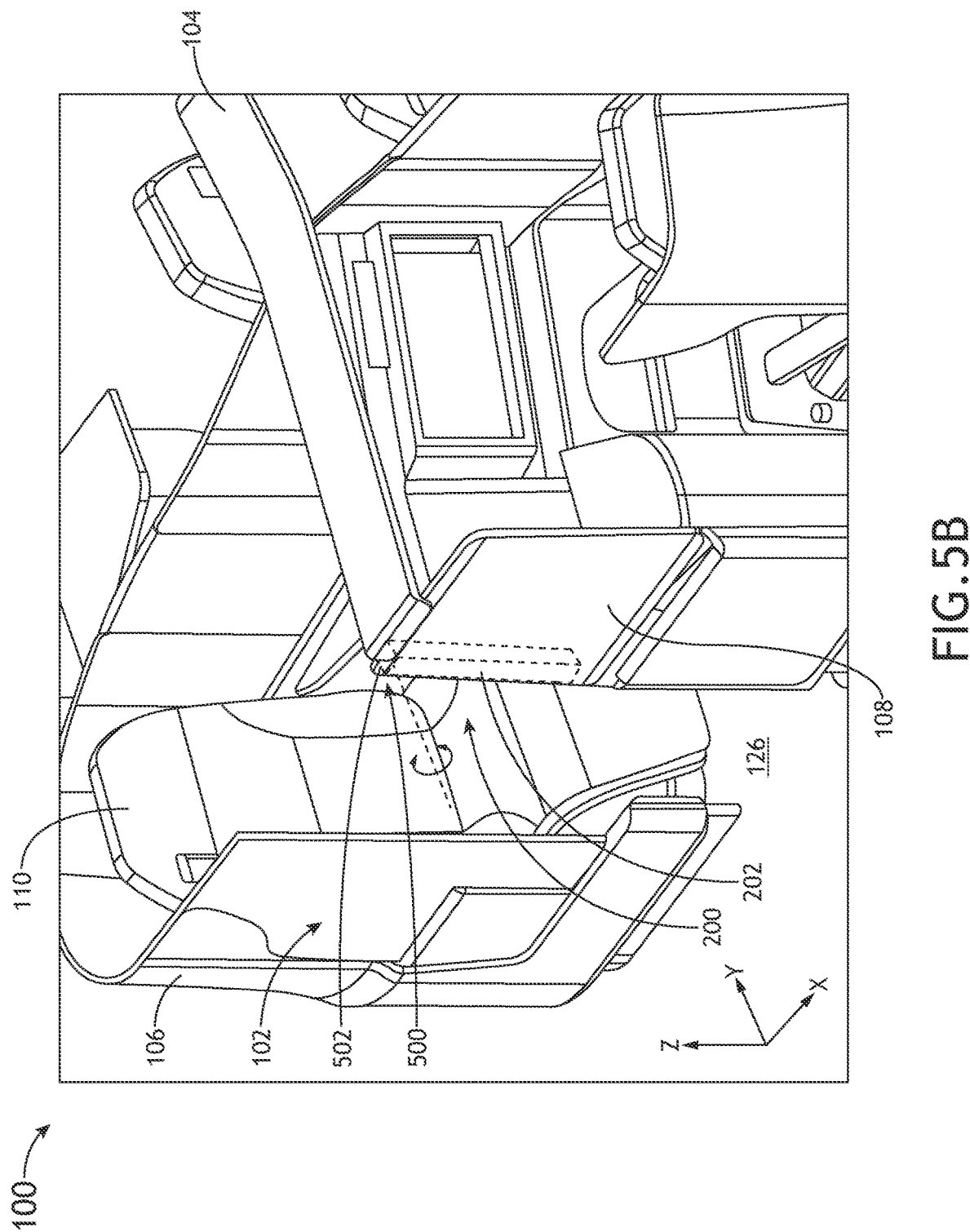
FIG. 5B illustrates an aircraft cabin with a passenger suite including an actuatable door, in accordance with one or more embodiments of the disclosure.

Referring now to FIGS. 5A-5C, an example embodiment of a set of cartridge positions are illustrated, in accordance with one or more embodiments of the disclosure.

The actuatable door 200 may include an actuation assembly 500. For example, the actuation assembly 500 may include a hinge 502 coupled to the cartridge 202 and to the bridge 104 and/or the suite wall 106 (e.g., one or more suite wall elements 108). The cartridge 202 may be coupled to the bridge 104 and/or the suite wall 106 (e.g., one or more suite wall elements 108) via the actuation assembly 500.

The cartridge 202 may be stowed in a space 504 within the passenger suite 102 that is intuitive and easily accessible. For example, the space 504 may be proximate to a top edge of the passenger suite 102 (e.g., of the bridge 104) and proximate to the opening 126. By way of another example, the space 504 may be proximate to a top edge of the suite wall 106, and proximate to the opening 126.

The cartridge 202 may be actuatable via the actuation assembly 500. For example, the cartridge 202 may be rotatable about an axis (e.g., a horizontal or substantially horizontal axis, or other axis) through the hinge 502 between the stowed cartridge position (e.g., as illustrated in FIG. 5A) and the deployed cartridge position (e.g., as illustrated in FIG. 5C) through one or more intermediate cartridge positions (e.g., one being illustrated in FIG. 5B). For instance, the hinge 502 may include a smooth-bore pin. By way of another example, the cartridge 202 may be rotatable and translatable about an axis (e.g., a horizontal or substantially horizontal axis, or other axis) via the hinge 502 between the stowed cartridge position (e.g., as illustrated in FIG. 5A) and the deployed cartridge position (e.g., as illustrated in FIG. 5C) through one or more intermediate cartridge positions (e.g., one being illustrated in FIG. 5B). For instance, the hinge 502 may include a threaded pin or screw. It is noted herein the stowed cartridge position as illustrated in FIG. 5A may be considered a stowed door position. In addition, it is noted herein the deployed cartridge position as illustrated in FIG. 5C may be considered an intermediate door position.

The cartridge 202 may be held in the stowed cartridge position within the space 504 via the interlocking assembly 308. For example, the cartridge 202 may be coupled to the bridge 104 and/or the suite wall 106 via the interlocking assembly 308. The cartridge 202 may be held in the deployed cartridge position across the opening 126 via the interlocking assembly 310. For example, the cartridge 202 may be coupled to a component installed within the area 312 or proximate to the area 312 via the interlocking assembly 308. The interlocking assemblies 308, 310 may include, but are not limited to, latch assemblies, magnetic assemblies, or the like. It is noted herein the interlocking assemblies 308, 310 may be standalone, or may share components (e.g., shared latch components, magnetic components, or the like). The cartridge 202 may be received by a notch or sit on a landing within the area 312 proximate to the opening 126 when in the deployed cartridge position.

Referring now to FIGS. 6A-6D, an example embodiment of a set of cartridge positions are illustrated, in accordance with one or more embodiments of the disclosure.

The actuatable door 200 may include an actuation assembly 600. For example, the actuation assembly 600 may include a hinge 602 coupled to the cartridge 202 and to the suite wall 106 (e.g., one or more suite wall elements 108). The cartridge 202 may be coupled to the suite wall 106 (e.g., one or more suite wall elements 108) via the actuation assembly 600.

The cartridge 202 may be stowed in a space 604 within the passenger suite 102 that is intuitive and easily accessible. For example, the space 604 may be proximate to a top edge of the suite wall 106, and proximate to the opening 126.

The cartridge 202 may be actuatable via the actuation assembly 600.

Figure 6A:
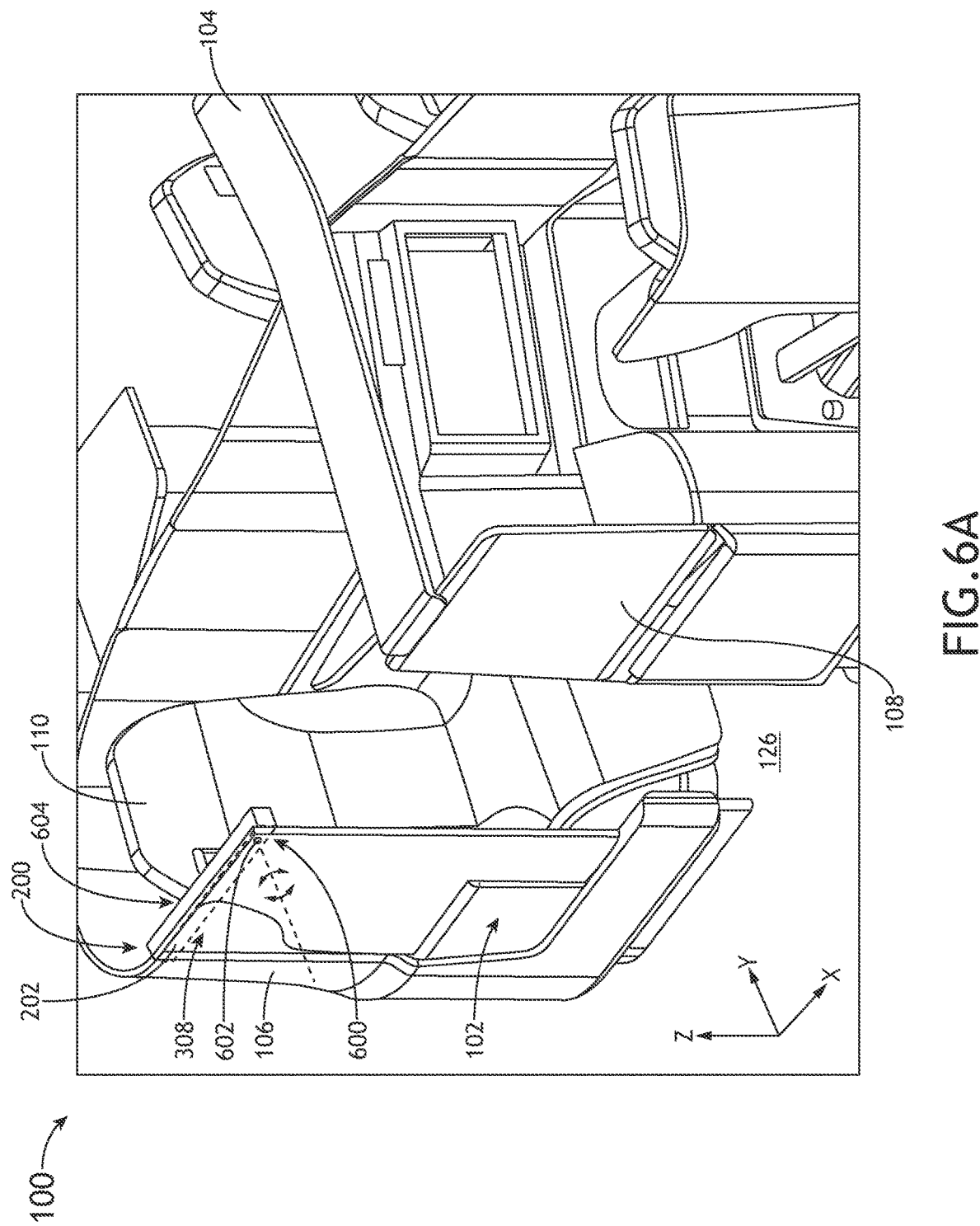
FIG. 6A illustrates an aircraft cabin with a passenger suite including an actuatable door, in accordance with one or more embodiments of the disclosure.
Figure 6B:
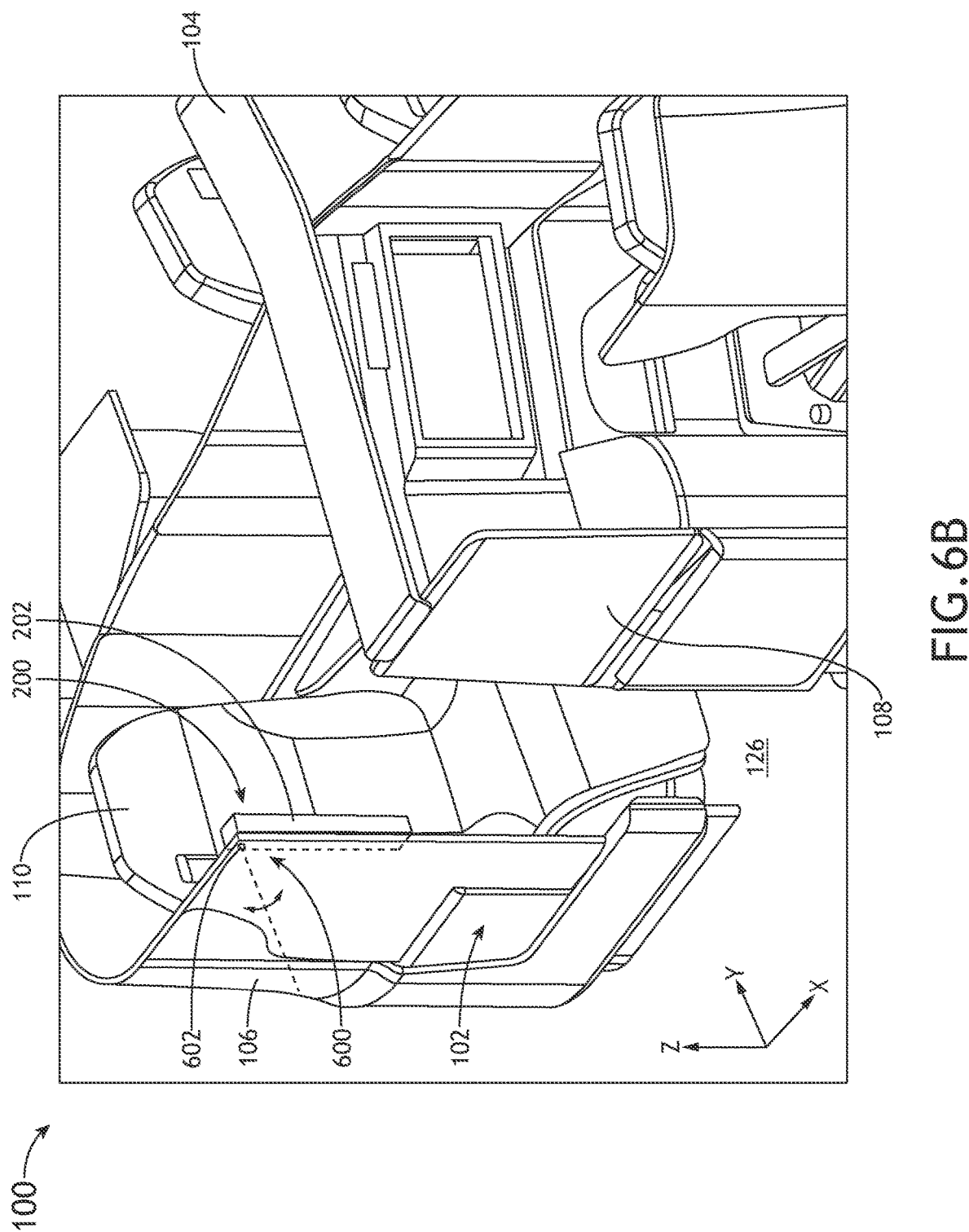
FIG. 6B illustrates an aircraft cabin with a passenger suite including an actuatable door, in accordance with one or more embodiments of the disclosure.
Figure 6C:
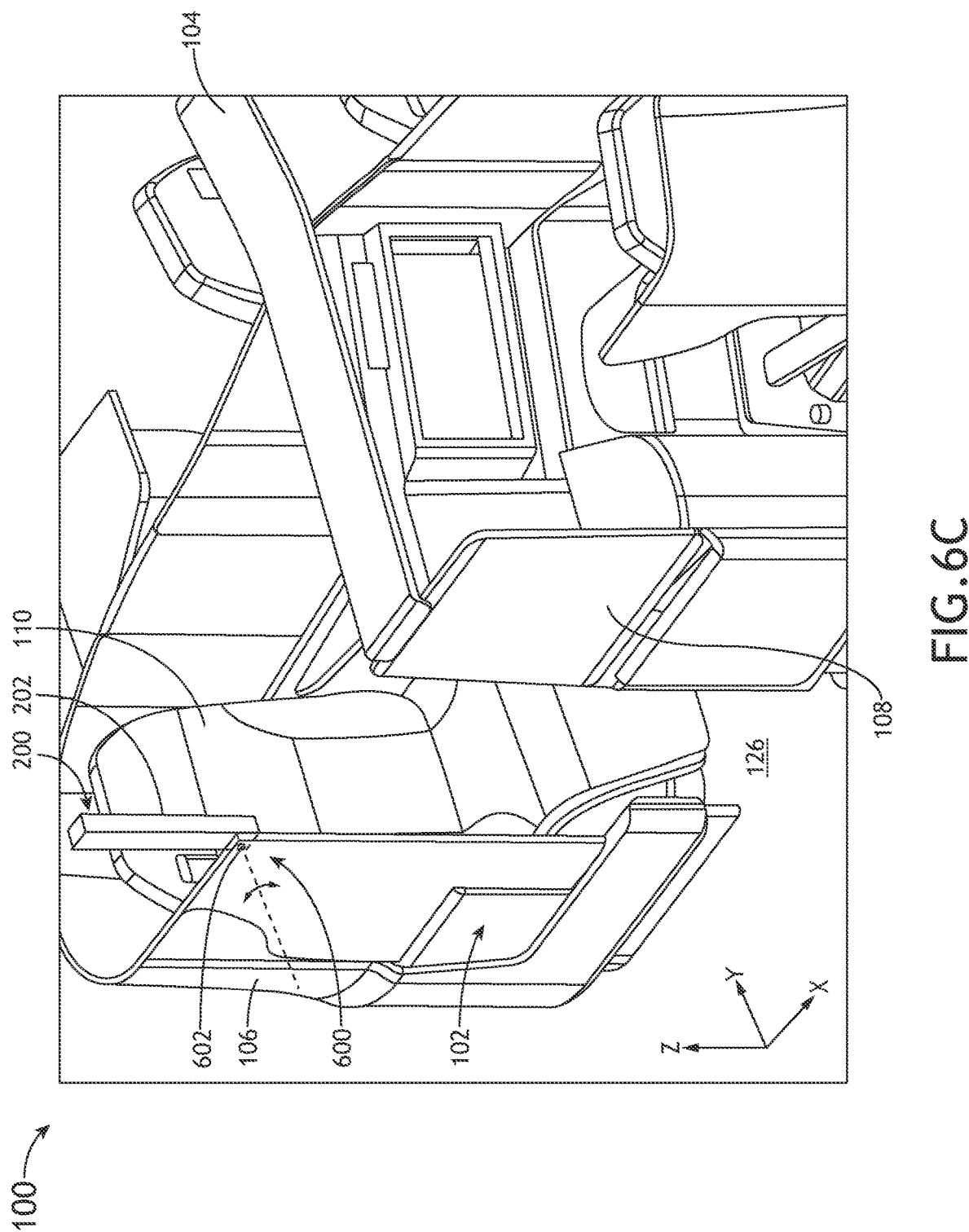
FIG. 6C illustrates an aircraft cabin with a passenger suite including an actuatable door, in accordance with one or more embodiments of the disclosure.
Figure 6D:
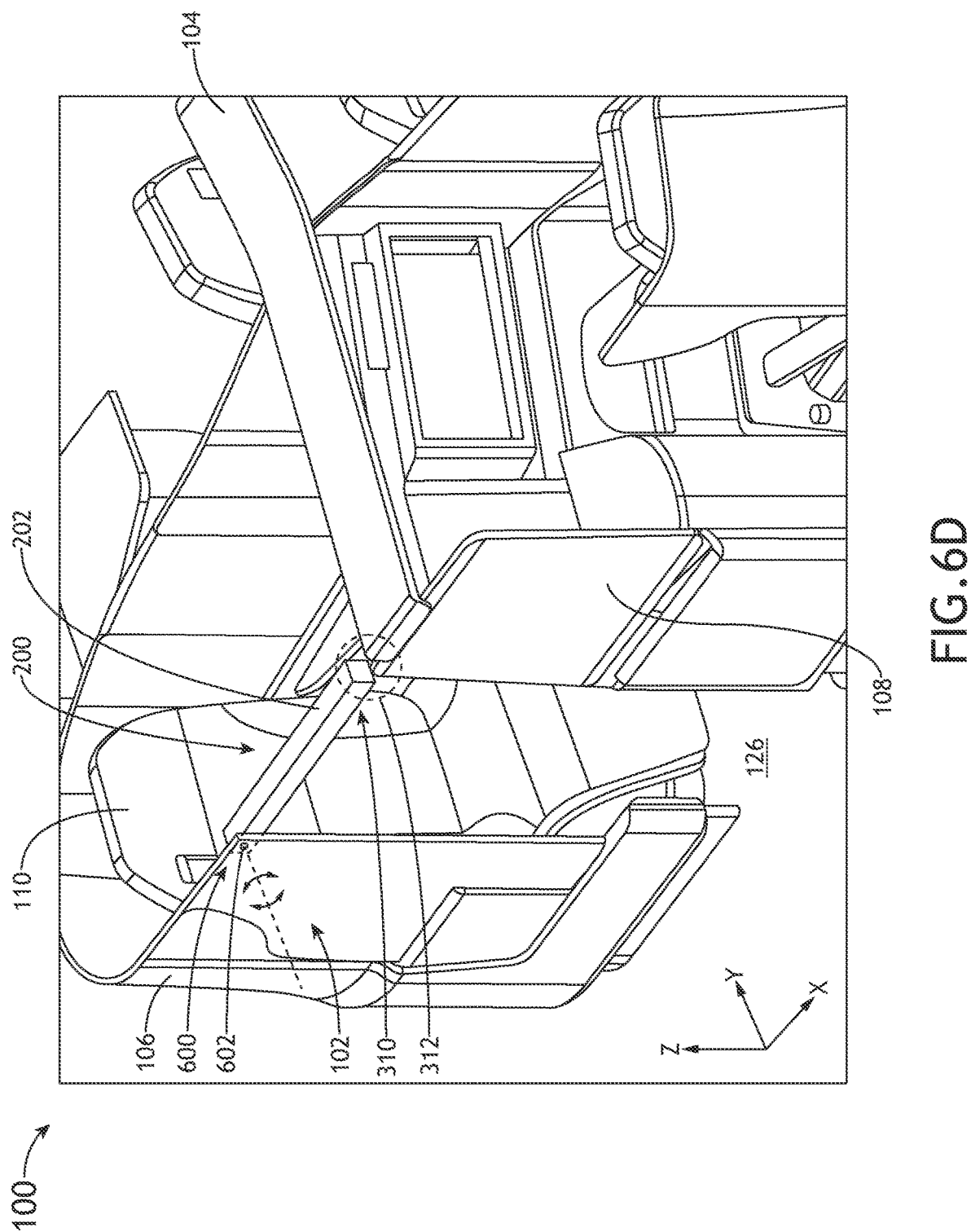
FIG. 6D illustrates an aircraft cabin with a passenger suite including an actuatable door, in accordance with one or more embodiments of the disclosure.

For example, the cartridge 202 may be rotatable about an axis (e.g., a horizontal or substantially horizontal axis, or other axis) through the hinge 602 between the stowed cartridge position (e.g., as illustrated in FIG. 6A) and the deployed cartridge position (e.g., as illustrated in FIG. 6D) through one or more intermediate cartridge positions (e.g., being illustrated in FIGS. 6B and 6C). For instance, the hinge 602 may include a smooth-bore pin. In addition, the cartridge 202 may be rotatable about the axis through the hinge 602 counterclockwise through the intermediate position as illustrated in FIG. 6B. Further, the cartridge 202 may be rotatable about the axis through the hinge 602 clockwise through the intermediate position as illustrated in FIG. 6C. It is noted herein the stowed cartridge position as illustrated in FIG. 6A may be considered a stowed door position. In addition, it is noted herein the deployed cartridge position as illustrated in FIG. 6D may be considered an intermediate door position.

By way of another example, the cartridge 202 may be rotatable and translatable about an axis (e.g., a horizontal or substantially horizontal axis, or other axis) through the hinge 602 between the stowed cartridge position (e.g., as illustrated in FIG. 6A) and the deployed cartridge position (e.g., as illustrated in FIG. 6D) through one or more intermediate cartridge positions (e.g., being illustrated in FIGS. 6B and 6C). For instance, the hinge 602 may include a threaded pin or screw. In addition, the cartridge 202 may be rotatable and translatable about the axis through the hinge 602 counterclockwise through the intermediate position as illustrated in FIG. 6B. Further, the cartridge 202 may be rotatable and translatable about the axis through the hinge 602 clockwise through the intermediate position as illustrated in FIG. 6C. It is noted herein the stowed cartridge position as illustrated in FIG. 6A may be considered a stowed door position. In addition, it is noted herein the deployed cartridge position as illustrated in FIG. 6D may be considered an intermediate door position.

The cartridge 202 may be held in the stowed cartridge position within the space 604 via the interlocking assembly 308. For example, the cartridge 202 may be coupled to the suite wall 106 via the interlocking assembly 308. The cartridge 202 may be held in the deployed cartridge position across the opening 126 via the interlocking assembly 310. For example, the cartridge 202 may be coupled to a component installed within the area 312 or proximate to the area 312 via the interlocking assembly 308. The interlocking assemblies 308, 310 may include, but are not limited to, latch assemblies, magnetic assemblies, or the like. It is noted herein the interlocking assemblies 308, 310 may be stand-alone, or may share components (e.g., shared latch components, magnetic components, or the like). The cartridge 202 may be received by a notch or sit on a landing within the area 312 proximate to the opening 126 when in the deployed cartridge position.

It is noted herein the actuatable door 200 may not need to be stowed and rotated about the axis 180 degrees (or approximately 180 degrees), as illustrated in FIGS. 5A-5C and 6A-6D, but may instead be rotated a different angle. For example, the actuatable door 200 may be vertical (or substantially vertical) and aligned with a vertical (or substantially vertical) edge of the opening 126, such the intermediate cartridge position illustrated in FIG. 6B is the stowed cartridge position and the cartridge 202 rotates only 90 degrees (or approximately 90 degrees) between the stowed cartridge position and the deployed cartridge position. Therefore, the above description should not be interpreted as a limitation on the scope of the disclosure but merely an illustration.

FIGS. 7A-7F illustrate the aircraft cabin 100 including the passenger suite 102, in accordance with one or more embodiments of the disclosure.

The actuatable door 200 may include a mechanism 700 housed within the cartridge 202. The flexible privacy divider 204 may be configured to deploy from and stow in the cartridge 202 via a mechanism 700, actuating between the stowed divider position (e.g., as illustrated in FIG. 3C, 4C, 5C, or 6D) and the deployed divider position (e.g., as illustrated in FIG. 7B, 7D, or 7F) through one or more intermediate divider positions (e.g., one being illustrated in FIG. 7A, 7C, or 7E). For example, the mechanism 700 may include, but is not limited to, a roller mechanism or other mechanism configured to actuate the flexible privacy divider 204 in a rotational motion, a drawstring mechanism or other mechanism configured to actuate the flexible privacy divider 204 in a translational motion, or the like. It is noted herein the deployed divider position as illustrated in FIGS. 7B, 7D, and 7F may be considered a deployed door position.

It is noted herein the mechanism 700 may be configured for a controlled return through an infinite number of intermediate divider positions between the stowed divider position and the deployed divider position, such that the flexible privacy divider 204 may be set in any of an infinite number of positions. In addition, it is noted herein the mechanism 700 may be configured for a defined number of intermediate divider positions for the flexible privacy divider 204. Further, it is noted herein the mechanism 700 may be configured for a snap-release and return of the flexible privacy divider 204 between the deployed divider position and the stowed divider position, such that there are no intermediate divider positions.

Figure 7A:
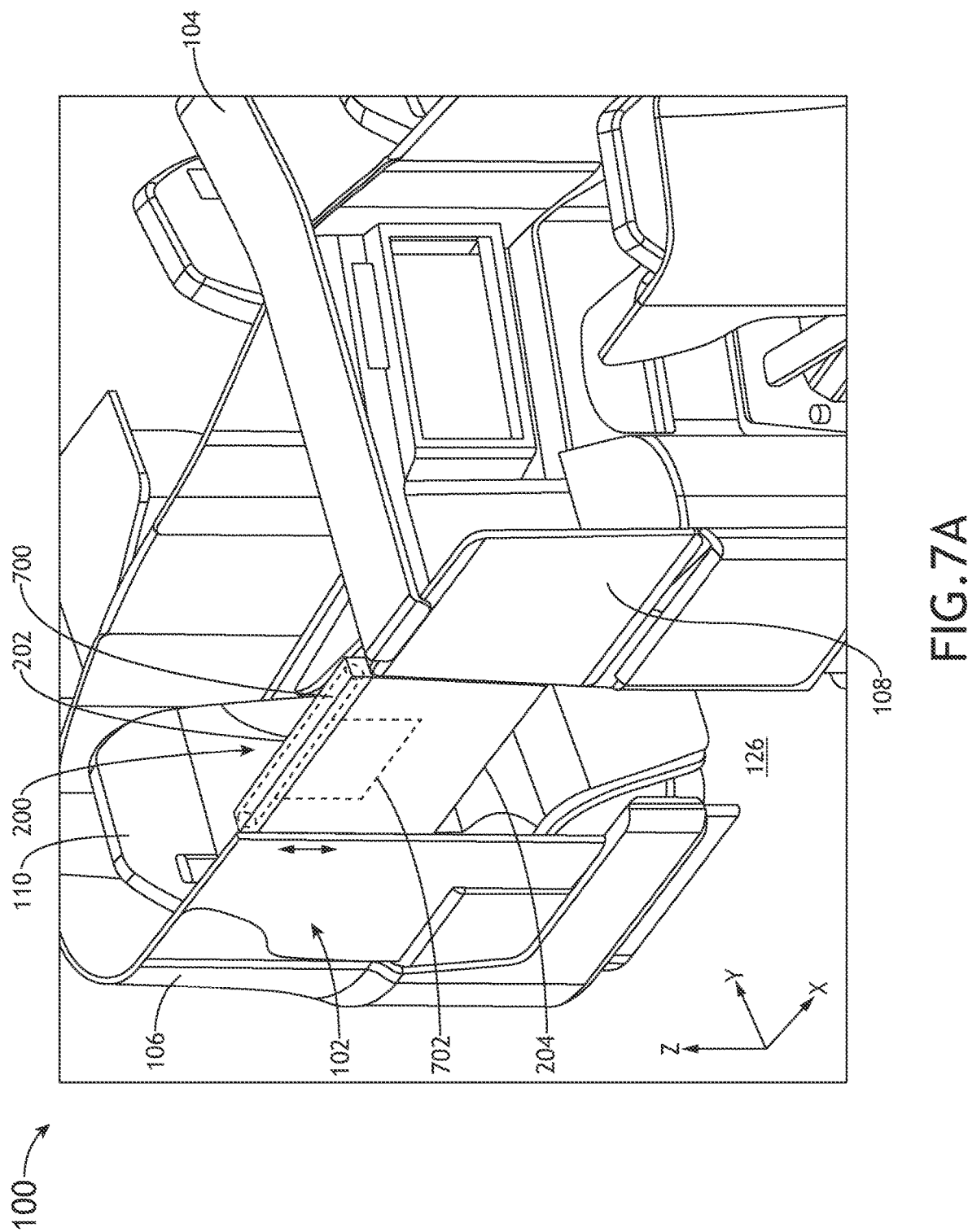
FIG. 7A illustrates an aircraft cabin with a passenger suite including an actuatable door, in accordance with one or more embodiments of the disclosure.
Figure 7B:
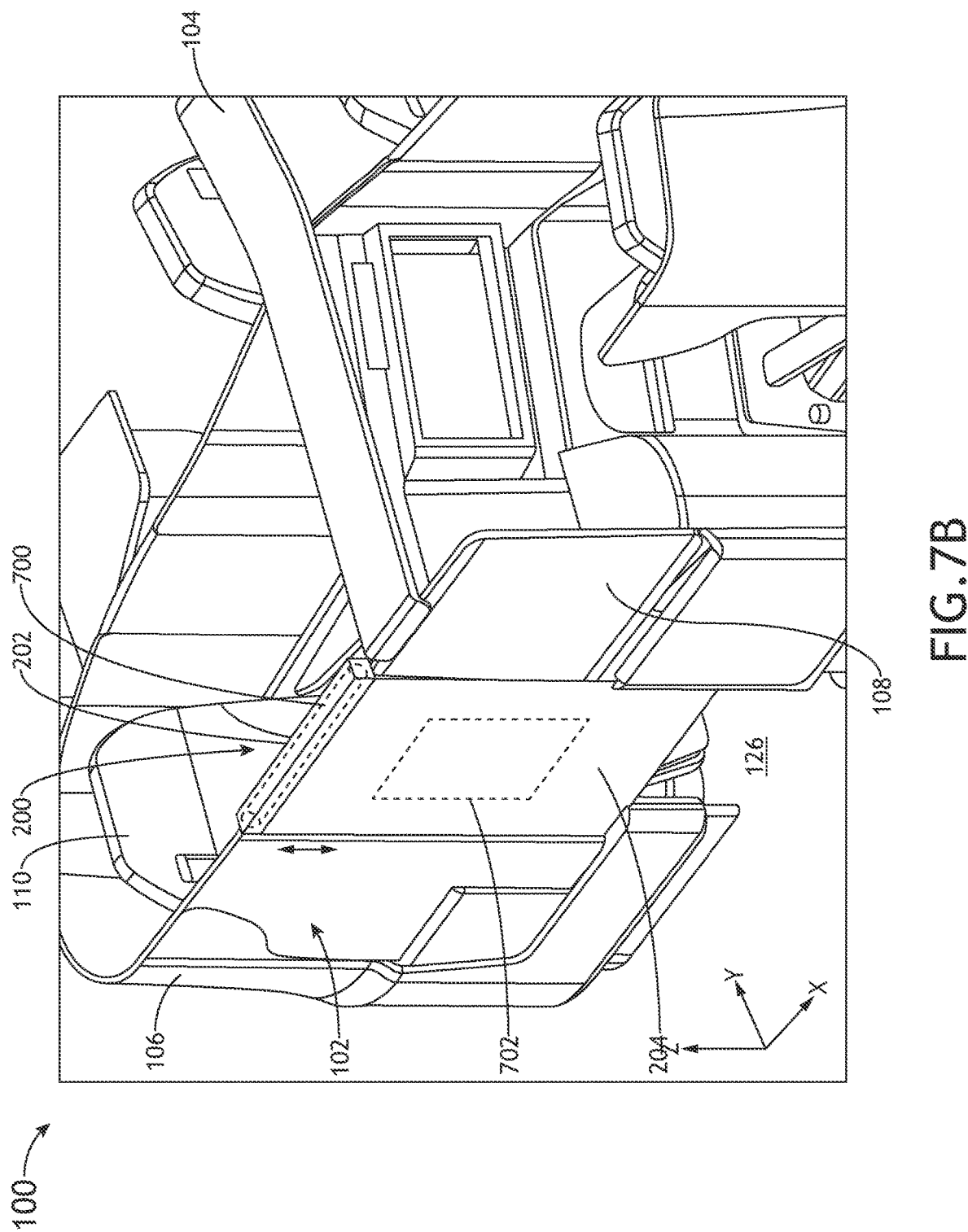
FIG. 7B illustrates an aircraft cabin with a passenger suite including an actuatable door, in accordance with one or more embodiments of the disclosure.

Referring now to FIGS. 7A and 7B, the flexible privacy divider 204 may be fabricated from one or more continuous pieces of material 702. For example, the one or more continuous pieces of material 702 may be a solid piece of material or a mesh material. The one or more continuous pieces of material 702 may be flat (or substantially flat). The one or more continuous pieces of material 702 may be accordion-folded. The one or more continuous pieces of material 702 may be actuatable, deploying from and/or stowing with the cartridge 202 via the mechanism 700.

Figure 7C:
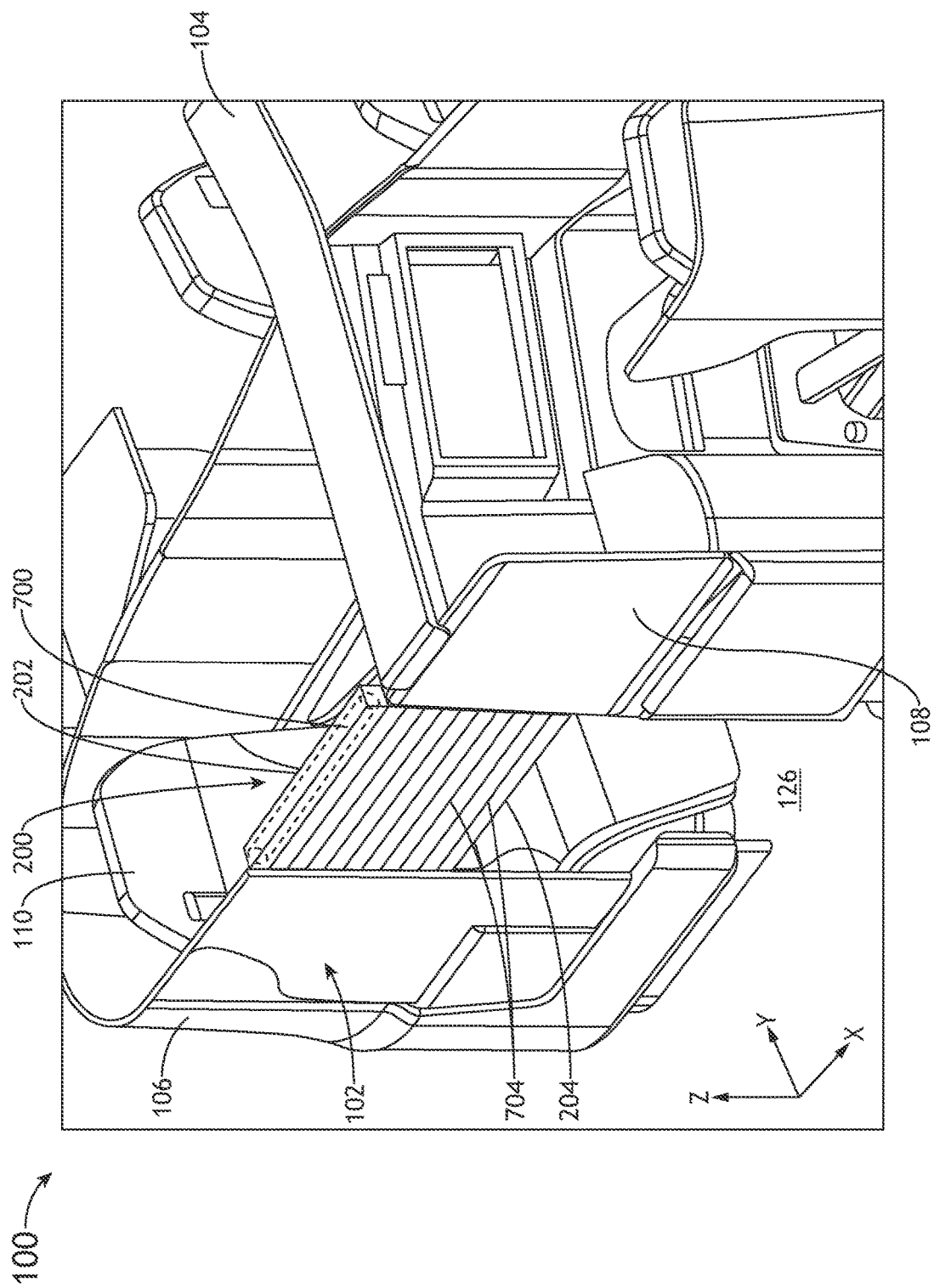
FIG. 7C illustrates an aircraft cabin with a passenger suite including an actuatable door, in accordance with one or more embodiments of the disclosure.
Figure 7D:
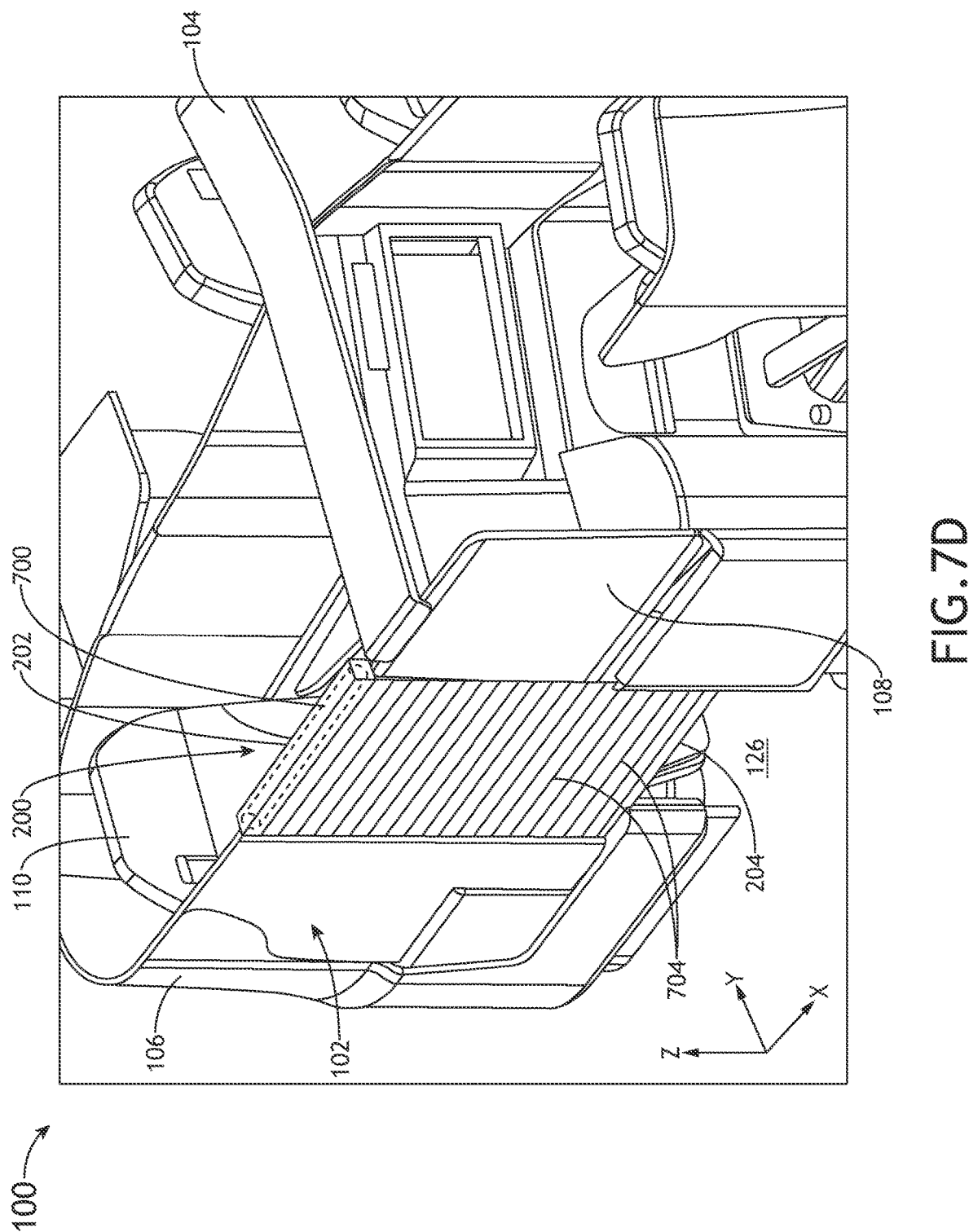
FIG. 7D illustrates an aircraft cabin with a passenger suite including an actuatable door, in accordance with one or more embodiments of the disclosure.

Referring now to FIGS. 7C and 7D, the flexible privacy divider 204 may be fabricated from segmented or slatted pieces of overlaid material 704. For example, the segmented or slatted pieces of overlaid material 704 may form blinds. By way of another example, the segmented or slatted pieces of overlaid material 704 may form tambour slats. The segmented or slatted pieces of overlaid material 704 may be actuatable, deploying from and/or stowing with the cartridge 202 via the mechanism 700.

Figure 7E:
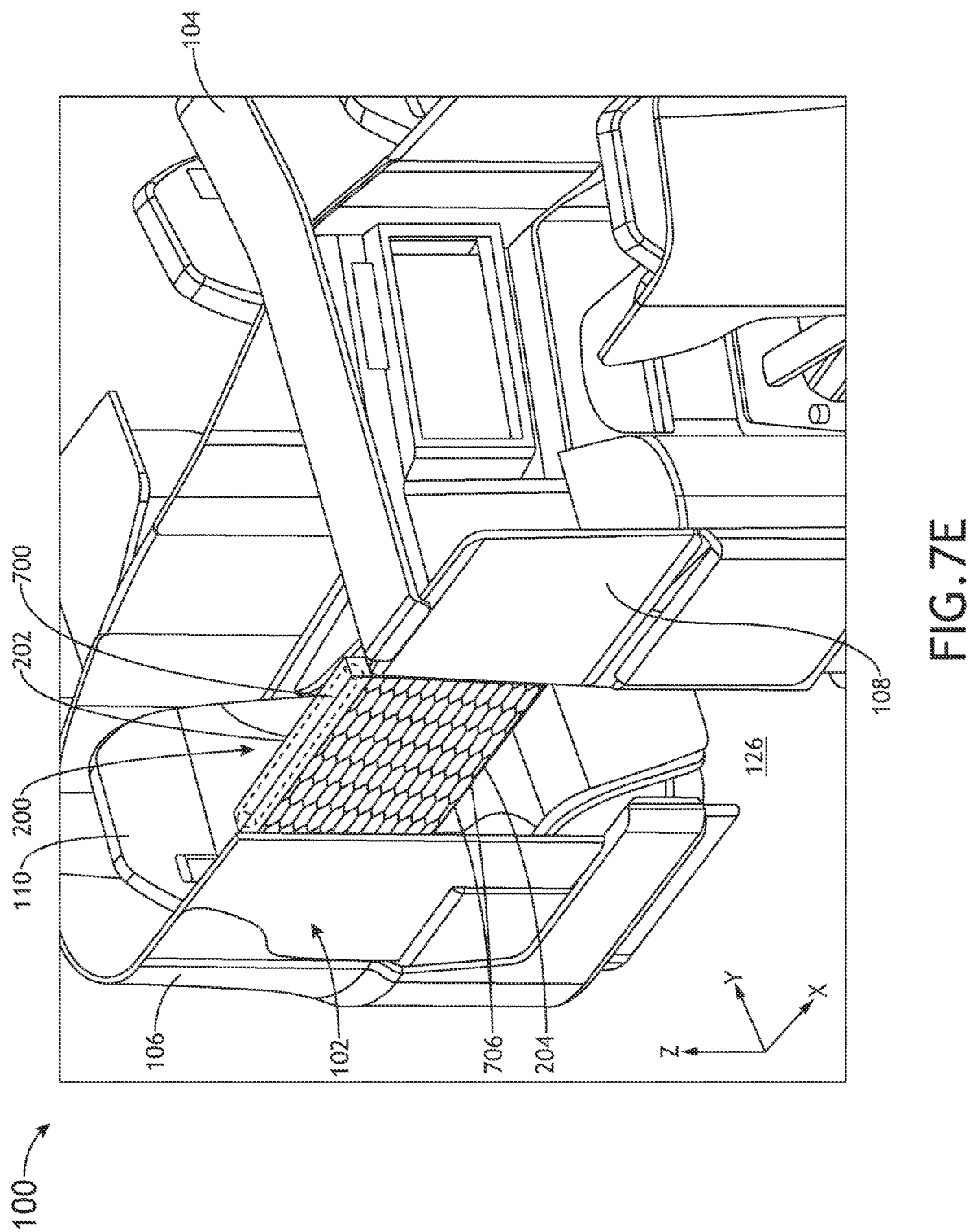
FIG. 7E illustrates an aircraft cabin with a passenger suite including an actuatable door, in accordance with one or more embodiments of the disclosure.
Figure 7F:
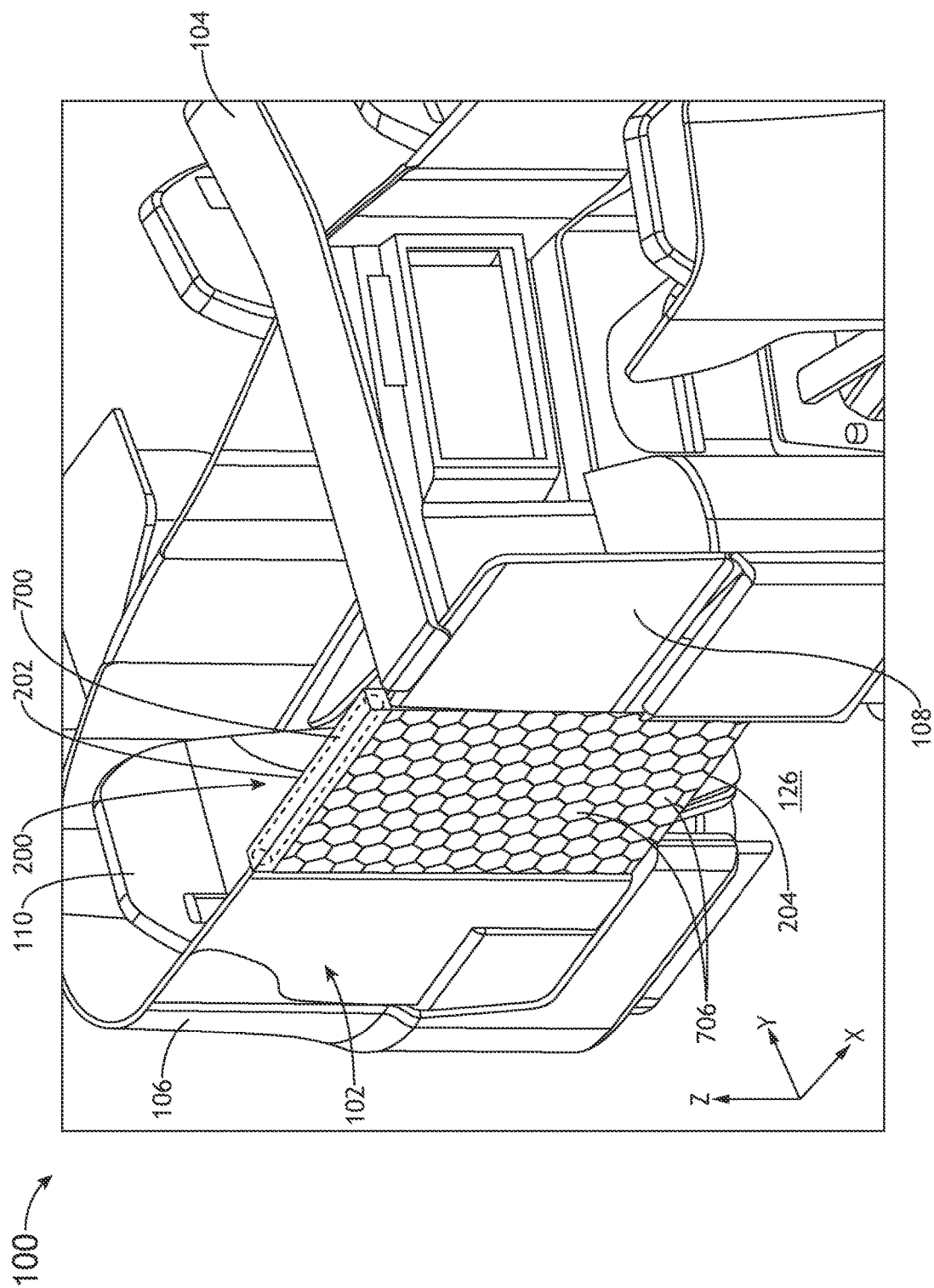
FIG. 7F illustrates an aircraft cabin with a passenger suite including an actuatable door, in accordance with one or more embodiments of the disclosure.

Referring now to FIGS. 7E and 7F, the flexible privacy divider 204 may be fabricated from a honeycomb material or origami-folded material 706. The honeycomb material or origami-folded material 706 may be actuatable, deploying from and/or stowing with the cartridge 202, via the mechanism 700.

The actuatable door 200 may include any number of layers, with the layers including a multiple of or a combination of the above flexible privacy dividers 204. For example, the actuatable door 200 may include a first layer for complete privacy (e.g., a solid and opaque flexible privacy divider 204, a segmented or slatted flexible privacy divider 204, or the like) and a second layer for partial privacy (e.g., a solid and sheer or translucent flexible privacy divider 204, a mesh flexible privacy divider 204, or the like). Depending on the build, the honeycomb material or origami-folded material 706 may be solid and opaque, solid and sheer or translucent, or fabricated from a mesh. It is noted herein the cartridge 202 may house multiple mechanisms 700 corresponding to the multiple flexible privacy dividers 204. In addition, it is noted herein the actuatable door 200 may include multiple cartridges 202, each cartridge 202 including a flexible privacy divider 204.

It is noted herein the flexible privacy divider 204 may include one or more markings. For example, the one or more markings may be visible when the flexible privacy divider 204 is in the deployed divider position. For instance, the one or more markings may be trim (e.g., interior or exterior décor panels) matching other trim on an exterior surface of the passenger suite 102 (and/or in the aircraft cabin 100), may be graphics requesting privacy or not to be disturbed, or the like.

It is noted herein the actuatable door 200 may be configured for quick removal from the passenger suite 102 for stowage within the aircraft cabin 100 and/or repairs. For example, the interlocking assemblies 308, 310 may be configured with quick-release components.

It is noted herein the cartridge 202 and/or the flexible privacy divider 204 may be manually actuated. In addition, it is noted herein the cartridge 202 and/or the flexible privacy divider 204 may be electrically-actuated via a motor (e.g., a servo motor, or the like) coupled to a controller. For example, the controller may include one or more processors and memory, where the memory is configured to store a set of program instructions, where the set of program instructions are configured to cause the one or more processors to perform one or more actions with respect to actuations of the actuatable door 200. A user input device and/or a display may be installed within the passenger suite 102 or coupled to an exterior surface of the passenger suite 102, and the controller is configured to receive commands (e.g., to deploy the actuatable door 200, stow the actuatable door 200, deploy the cartridge 202, stow the cartridge 202, deploy the flexible privacy divider 204, and/or stow the flexible privacy divider 204) from the user input device and/or the display.

It is noted herein "vertical" may be understood as being defined with respect to a z-axis as illustrated in the Figures. In addition, it is noted herein "horizontal" may be understood as being defined with respect to an x-axis or a y-axis as illustrated in the Figures.

Although embodiments of the disclosure illustrate the actuatable door 200 being installed and actuatable within the boundaries of the passenger suite 102, it is noted herein the actuatable door 200 may be coupled to an exterior surface of the passenger suite 102 and actuatable between the door stowed position and the door deployed position outside of the passenger suite 102 (e.g., in the aircraft aisle 128). Therefore, the above description should not be interpreted as a limitation on the scope of the disclosure but merely an illustration.

In this regard, the passenger suite 102 includes an actuatable door 200. The actuatable door 200 is fabricated from a flexible material so as to reduce issues with weight. The actuatable door 200 is able to deploy in an upward/downward configuration so as to reduce issues with lateral compression. The actuatable door 200 is configured to fit within an existing product design with the minimal possible amount of disruption to the existing design, so as to streamline the certification process with respect to aviation guidelines and standards.

Although embodiments of the disclosure are directed to an aviation environment such as an aircraft cabin 100, it is noted herein the actuatable door 200 is not limited to the aviation environment and/or the aircraft components within the aviation environment. For example, the actuatable door 200 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the actuatable door 200 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger suite, the aircraft passenger suite comprising:
  a suite wall installed within an aircraft cabin, the suite wall including an opening configured to allow for access to the passenger suite from an open area within the aircraft cabin; and
  an actuatable door coupled to the suite wall, the actuatable door being configured to actuate between a stowed door position and a deployed door position via at least one intermediate door position, the actuatable door being configured to separate the passenger suite from the open area within the aircraft cabin when in the deployed door position and provide privacy to the aircraft passenger suite, the actuatable door comprising:
    a flexible privacy divider, the flexible privacy divider being configured to actuate between a stowed divider position and a deployed divider position;
    a cartridge, the cartridge being configured to actuate between a stowed cartridge position and a deployed cartridge position via at least one intermediate cartridge position, the cartridge held in the deployed cartridge position across the opening when the flexible privacy divider is in the deployed divider position across the opening; and
    a mechanism housed within the cartridge, the mechanism being configured to actuate the flexible privacy divider between the stowed divider position and the deployed divider position, the flexible privacy divider being at least partially stowed within the cartridge when in the stowed divider position.

2. The aircraft passenger suite of claim 1, the actuatable door being in the stowed door position when the cartridge is in the stowed cartridge position.

3. The aircraft passenger suite of claim 1, the actuatable door being in the at least one intermediate door position when the cartridge is in the deployed cartridge position and the flexible privacy divider is in the stowed divider position.

4. The aircraft passenger suite of claim 1, the actuatable door being in the deployed door position when the flexible privacy divider is in the deployed divider position.

5. The aircraft passenger suite of claim 1, the flexible privacy divider being fabricated from a continuous piece of material.

6. The aircraft passenger suite of claim 1, the flexible privacy divider being fabricated from a plurality of segmented or slatted pieces of overlaid material.

7. The aircraft passenger suite of claim 1, the flexible privacy divider being fabricated from a honeycomb material or origami-folded material.

8. The aircraft passenger suite of claim 1, at least a portion of the passenger suite being defined by a bridge installed within the aircraft cabin.

9. The aircraft passenger suite of claim 8, the actuatable door comprising:
   an actuation assembly including a hinge, the hinge being coupled to at least one of the suite wall or the bridge,
   the cartridge being configured to rotate between the stowed cartridge position and the deployed cartridge position via the at least one intermediate cartridge position about an axis through the hinge.

10. The aircraft passenger suite of claim 8, the actuatable door comprising:
    an actuation assembly including a hinge, the hinge being coupled to at least one of the suite wall or the bridge,
    the cartridge being configured to rotate and translate between the stowed cartridge position and the deployed cartridge position via the at least one intermediate cartridge position about an axis through the hinge.

11. The aircraft passenger suite of claim 8, the cartridge being stowed within a space proximate to the bridge when in the stowed cartridge position.

12. The aircraft passenger suite of claim 8, further comprising:
    a channel proximate to at least one of the suite wall or the bridge,
    the cartridge being configured to translate between the stowed cartridge position and the deployed cartridge position via the at least one intermediate cartridge position along the channel.

13. The aircraft passenger suite of claim 1, further comprising:
    an aircraft seat,
    the cartridge being stowed within a space proximate to the aircraft seat when in the stowed cartridge position.

14. The aircraft passenger suite of claim 13, the actuatable door comprising:
    an actuation assembly including a hinge, the hinge being coupled to the suite wall,
    the cartridge being configured to rotate between the stowed cartridge position from the space proximate to the aircraft seat and the deployed cartridge position via the at least one intermediate cartridge position about an axis through the hinge.

15. An actuatable door for an aircraft passenger suite installed within an aircraft cabin, the actuatable door comprising:
    a flexible privacy divider, the flexible privacy divider being configured to actuate between a stowed divider position and a deployed divider position;
    a cartridge, the cartridge being configured to actuate between a stowed cartridge position and a deployed cartridge position via at least one intermediate cartridge position, the cartridge held in the deployed cartridge position across the opening when the flexible privacy divider is in the deployed divider position across the opening; and
    a mechanism housed within the cartridge, the mechanism being configured to actuate the flexible privacy divider between the stowed divider position and the deployed divider position, the flexible privacy divider being at least partially stowed within the cartridge when in the stowed divider position,
    the actuatable door being coupled to a suite wall of the aircraft passenger suite, the suite wall including an opening configured to allow for access to the passenger suite from an open area within the aircraft cabin,
    the actuatable door being configured to actuate between a stowed door position and a deployed door position via at least one intermediate door position, the actuatable door being configured to separate the passenger suite from the open area within the aircraft cabin when in the deployed door position and provide privacy to the aircraft passenger suite.

\* \* \* \* \*